LINE CONCENTRATOR AND ITS ASSOCIATED CIRCUITS
IN A TIME MULTIPLEX TRANSMISSION SYSTEM
Filed April 5, 1963 14 Sheets-Sheet 1

March 28, 1967 J. P. LE CORRE ETAL 3,311,705

LINE CONCENTRATOR AND ITS ASSOCIATED CIRCUITS IN A TIME MULTIPLEX TRANSMISSION SYSTEM

Filed April 5, 1963 14 Sheets-Sheet 3

March 28, 1967 J. P. LE CORRE ETAL 3,311,705

LINE CONCENTRATOR AND ITS ASSOCIATED CIRCUITS IN A TIME MULTIPLEX TRANSMISSION SYSTEM

Filed April 5, 1963 14 Sheets-Sheet 5

March 28, 1967 J. P. LE CORRE ETAL 3,311,705

LINE CONCENTRATOR AND ITS ASSOCIATED CIRCUITS IN A TIME MULTIPLEX TRANSMISSION SYSTEM

Filed April 5, 1963 14 Sheets-Sheet 12

United States Patent Office 3,311,705
Patented Mar. 28, 1967

3,311,705

LINE CONCENTRATOR AND ITS ASSOCIATED CIRCUITS IN A TIME MULTIPLEX TRANSMISSION SYSTEM

Jean Pierre Le Corre, Sainte-Genevieve-des-Bois, and Rene Alexandre Pierre Marcel Lefevre, Jose Serrano, and Raphael Guy Yelloz, Paris, France, assignors to International Standard Electric Corporation
Filed Apr. 5, 1963, Ser. No. 270,871
Claims priority, application France, Apr. 6, 1962, 893,616
13 Claims. (Cl. 179—15)

The present invention relates to time division multiplex (TDM) telephone or telegraph systems and more particularly to TDM systems using line concentrators remotely controlled from a distant exchange office.

By way of a non-limiting example, a system including in the present invention uses pulse code modulation and presents the following characteristics:

Sampling frequency: 100 kc., which gives a time frame period of 100 μs.
Number of channels: $m=25$, or a time interval of 4 μs per channel.
Number of digits in a code or a "message" transmitted on a channel: $p=8$, which gives a time interval assigned to a digit or "digit time slot" of 500 ns.

Since the transmission is carried out in binary code, a digit 1 is characterized by the presence of a pulse or message signal during the corresponding digit time slot and a digit 0 by the absence of pulse during the same time slot. To transmit messages between two exchange offices A and B the binary code is sent out on a trunk which comprises two lines assigned respectively to the transmission of A toward B and B toward A, respectively. For both switching and transmission, each trunk and each one of the $m$ channels are preferably identified by a binary code number. On each trunk, the homologous channels on the incoming and outgoing lines are identified by the same code number.

During transmission, the time positions of message signals sometimes fluctuate and may introduce decoding errors. In greater detail, each exchange office includes a local clock. Hence message signals transmitted from office B to office A, for example, are placed on a time scale set up by the local clock in office B. Then, due to fluctuations and to a drift between the two local office clocks, the message in the time scale on the trunk may arrive at office A on a time scale which is different from the local office A clock.

Since both switching and message transmission are controlled from time signals delivered by the local clocks, it is necessary to convert the trunk time scale into the exchange time scale. A U.S. patent application, Ser. No. 193,395, filed May 9, 1962, by Herry, Le Corre, and Yelloz now Patent No. 3,274,339, entitled, "Improvements to Pulse Transmission Systems" (and assigned to the present assignee), describes a group of circuits for so converting the time scales. First, the message signals received in the trunk time scale are retimed into the local clock time scale. Second, a synchronizing code transmitted on the 25th channel defines the channel time origin.

In like manner, the message signals also fluctuate during transmission between an exchange office and a remote concentrator. The concentrator comprises a local clock which is phased on the incoming signals. In addition, a simplified retiming device enables the concentrator to take these fluctuations into account.

A local clock supplies time signals referenced $t1$ to $t25$, each having a duration of 4 μs. The time interval defined by each of these signals is here called a "normal channel time slot." Message transmission from one office to either another office or a concentrator, occurs during each of the channel time slot signals $t1$ to $t24$. The channel time slot $t25$ is reserved for the transmission of the synchronizing code combination.

The digit time slot signals are referenced "1" to "8." The most significant digit of the number is transmitted first during the digit time slot "1." The digit time slot "2" carries to the next less significant digit, etc. By basic time slot signals referenced $a$, $b$, $c$, $d$, the digit time slots are divided into 4 equal time intervals, each of a duration of 125 ns. A digit time slot signal "1" starts at the same time as a normal channel time slot signal $t1$ to $t25$. Thus, for example, the basic time slot $b$ of the digit time slot "3" of the channel time slot $t12$ is hereinafter referenced "$t12.3b$."

The local clock also supplies "shifted channel time slot" signals $t'1$ to $t'25$ which lead by half a channel time slot with respect to the normal channel time slot signals. The digit time slot coincides with the beginning of one of these shifted signals. Thus, the digit time slot "5" and the digit time slot coinciding with the end of these shifted signals is the digit time slot "4." A time interval of one digit time slot defined by coincidence between the shifted signal $t'13$ and the signal of digit time slot "6" is hereinafter designated $t'13/6$. By way of example, this notation leads to the following equalities: $t.12.4=t'12/4$; $t.12.5=t'13/5$; $t.12.8=t'13/8$; $t'13.1=t'13/1$; $t.13.5=t'14/5$ etc.

In the concentrators and offices of a communication network, all the local clocks supply identical time signals. Thus, even though the trunk transmission time and the fluctuations distort the signal, all of the signals, nevertheless, carry the same references so that they may be shifted in time with respect to the time signals where a message originates.

Line concentrators reserve $m'$ channels for use by a group of $k$ subscribers with $k>m'$. By way of a non-limiting example, a concentrator may be considered as connected to an office by one multiplex trunk so that $m'$ represents the number of communication channels available on that trunk ($m'=m-1$). In this exemplary network, voice frequency signals which are transmitted over the trunk are sampled 10,000 times per second. Since the system comprises $m$ channels, the time given over to one sample is a channel time slot of 4 μs. The amplitude of each sample is proportional to the amplitude of the voice frequency signal at the time of sampling. These amplitude modulated pulses are then quanticized and coded in a binary code. Then, the $m$ codes or messages related to the $m$ channels are transmitted over the trunk in time succession during each frame period.

In order that $k$ subscribers may have access to any one of the $m'$ time multiplex channels, the concentrator includes a space switching device. This device selects an idle channel time slot, out of $m$, to which the subscriber line is connected. These switching devices are controlled by the interpretation of instructions written in a subscriber store circuit located in the concentrator. To reduce the line concentrator equipment, the operations of these switching devices, especially for the detection of calls and the location of called subscribers, are remote controlled from the office connected to the trunk.

An object of the present invention is thus to achieve a pulse code modulated telephone or telegraph system wherein subscriber's lines, distributed by groups of $k$, are connected to line concentrators located at a certain distance from an exchange office.

Another object of the invention is to remotely control the operations of space switching devices in each concentrator. More particularly, an object is to search for calling subscriber lines, to test called subscriber lines, and to identify subscribers responsive to orders transmitted by a call detector located in a distant office.

The above mentioned and other features of this invention and the manner of obtaining them will become more apparent, and the invention itself will be best understood by reference to the following description of an embodiment of the invention taken in conjunction with the accompanying drawings, in which.

The principles of logic algebra are used herein to simplfy the description of operations. The subject is comprehensively treated in numerous papers and in particular in the book "Logical Design of Digital Computers," by M. Phister (J. Wiley, editor). Thus, if A designates the presence of a signal, $\overline{A}$ designates the absence of the same signal. These two conditions are then related by the formula $Ax\overline{A}=0$, in which "$x$" symbolizes an AND function. If a condition C appears only when the conditions A and B are present simultaneously, the formula becomes $AxB=C$ and indicates a coincidence gate or AND circuit. If a condition D appears when any one of the two conditions E and F is present, the formula is $E+F=D$ and indicate a mixing gate or OR circuit.

Since these logical functions AND and OR are communicative, associative and distributive, one may write $A+B=B+A$; $Ax(B+C)=AB+AC$;

$$(A+B)(C+D)=AxC+AxD+BxC+BxD$$

etc. Last, a function of two variables A and B may present up to four possible combinations. Thus, if one writes $AxB$, all of the three other possible combinations are represented by the single expression $\overline{AxB}$.

Figure 1:
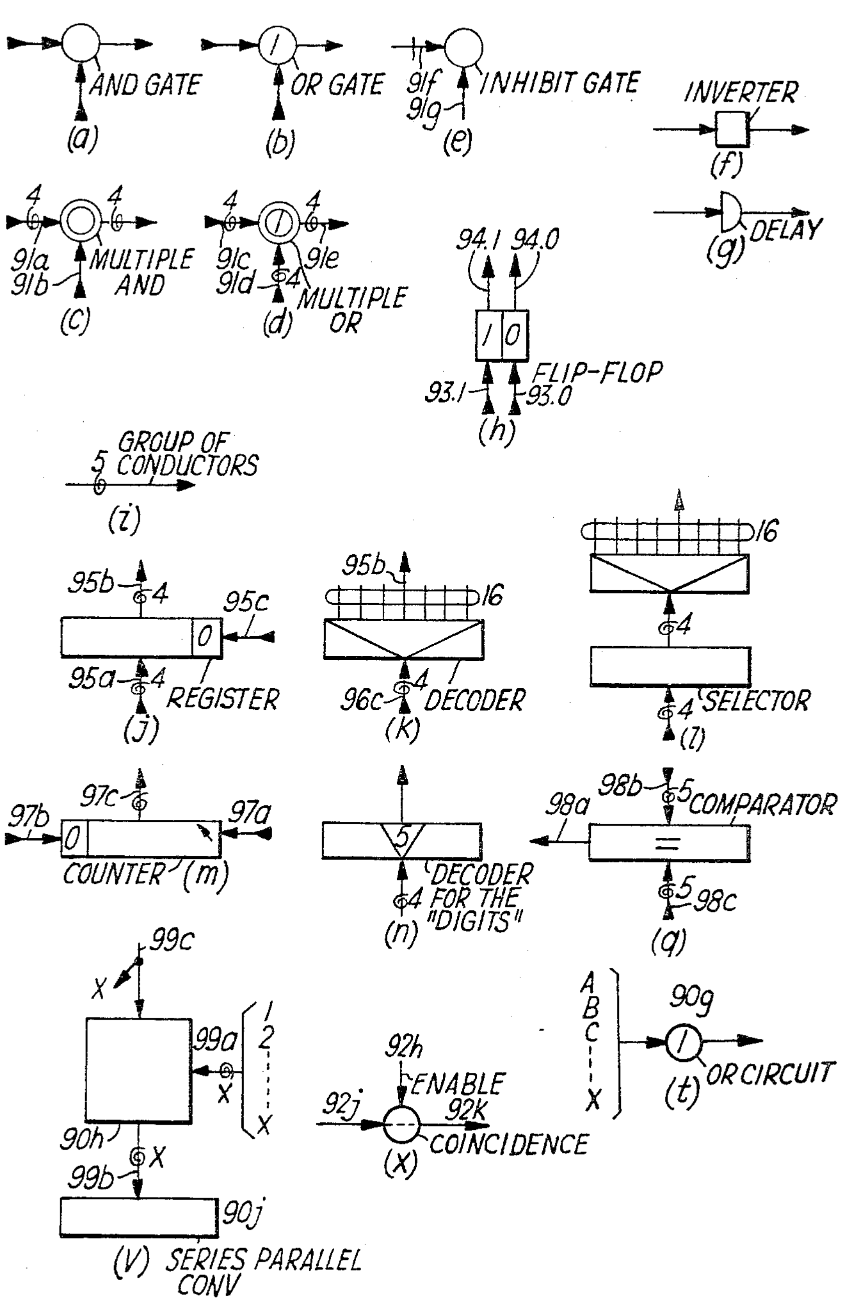
FIG. 1 represents the various symbols used in the detailed diagrams of the circuits.

The meanings of the symbols used in the drawings are given by FIG. 1 where:

FIG. 1($a$) shows a single AND circuit;

FIG. 1($b$) shows a single OR circuit;

FIG. 1($c$) shows a multiple AND circuit which comprises four AND circuits, each having one input connected to one of four separate conductors **91*a* and a second input connected to a common conductor 91*b***;

FIG. 1($d$) shows a multiple OR circuit which comprises four OR circuits, each having two inputs **91*c* and 91*d*—there are four output conductors 91*e***;

FIG. 1($e$) shows an INHIBIT circuit, with two inputs **91*f* and 91*g*, which is blocked when a signal is applied on the input 91*f***.

An input of an AND circuit is energized when a signal is applied to all of its inputs simultaneously.

FIG. 1($f$) represents an inverter circuit;

FIG. 1($g$) represents a delay circlit;

FIG. 1($h$) represents a bistable or flip-flop circuit when signals are applied to inputs 93–1 or 93–0 in order, the flip-flop switches to the 1 state or the 0 state, respectively. A voltage of same polarity as that of the control signal appears on the output 94–1 when the flip-flop is in the 1 state and on the output 94–0 when it is in the 0 state. If the flip-flop is referenced B1, the 1 state is written BI, and the 0 state is written $\overline{\text{BI}}$.

FIG. 1($i$) shows a group of several conductors, five in the considered example.

FIG. 1($j$) sows a register with bistable circuits, here four flip-flops having their 1 inputs connected to a group of conductors **95*a* and their 1 outputs connected to another group of conductors 95*b*. The "0" placed at one end of the register means that the register is cleared when a signal is applied to the conductor 95*c***.

FIG. 1($k$) shows a decoder which transforms a digit binary code appearing on the group of conductors **96*c* into a 1 out of $n$ code, i.e., here a four digit code is transformed into a 1 out of 16 code; that is, a signal appears on one out of the sixteen conductors 96*b*** for each number stored at the input.

FIG. 1($l$) shows a selector constituted by the combination of a register and a decoder.

FIG. 1($m$) shows a counter with bistable circuits which counts the pulses appearing on input **97*a*. The counter is cleared when a signal appears on the input 97*b*. The 1 output of each counter stage flip-flop is connected to the output conductors 97*c***.

The location of a flip-flop in a counter or a register, or the order number of a given digit in the same elements are identified so that a flip-flop of "rank 1" is the flip-flop in which the most significant digit of the number is stored. The flip-flop of "rank 2" is that in which the next less significant digit is stored. It should be noted that this notation is independent of the code used.

FIG. 1($n$) shows a decoder which delivers an output signal responsive only to a binary number that is the decimal equivalent of 5.

FIG. 1($q$) represents a code comparator which delivers a signal at its output **98*a* when the five-digit codes applied on its inputs 98*b* and 98*c*** are identical.

FIG. 1($t$) represents an OR circuit **90*g*** comprising numerous inputs on which may appear any one of the conditions A, B, C . . . X.

FIG. 1($v$) represents a series-parallel conversion circuit. Signals grouped in $x$ digit codes, arrive on conductor **99*c* in time succession. These signals are multiplexed into $x$ conductors, each of which is connected to the first input of a different AND circuit. These functions are shown logically by the block 90h. The second input of each AND circuit is connected to one of the $x$ conductors 99a which are marked by the "advance signals" 1, 2, 3 . . . $x$ in time succession. The $x$ AND circuits are thus successively activated, and the output signals present themselves separately on the $x$ conductors 99b to be stored, in parallel form, in the register 90j**. A circuit of the same type performs a parallel-series conversion.

FIG. 1($x$) shows a coincidence electronic gate. When activated by an enable signal applied on the input 92h, this gate transmits any signal applied to its main input 92j onto the output conductor 92k.

The expression "group of conductors" will be used in the description which follows. This expression characterizes:

Either a certain number of conductors, each of which is reserved for the transmission of a particular signal among different signals having a common characteristic; or A certain number of conductors assigned for the transmission of a binary code. Thus, a group of V conductors are assigned for the transmission of channel codes or channel time slot codes.

In the present invention, we shall describe (by way of a non-limiting example) a telephone system wherein the subscribers are connected, in groups of $k$, to concentrators. In this example, the number of concentrators is lower than $k(m-1)$ so that at most $(m-1)$ concentrators will be associated to an exchange office. By way of example, we have chosen $k \leqslant 2^8-1$ or $k \leqslant 255$, so that each subscriber is identified by an 8 digit subscriber's code.

The concentrator is remotely controlled from the call detector located in the distant office. Each cycle of operations concerns one the $k$ subscribers whose code digits are sent from the call detector during two successive time frame periods to the concentrator. The code digits of rank 1 to 4 are transmitted during the digit time slots 1 to 4 of a first time frame period and the code digits of rank 5 to 8, during the digit time slots 1 to 4 of the next succeeding time frame period.

In accordance with one aspect of the invention, each concentrator is connected to the distant exchange office by a trunk line. Any one free channel on this trunk, the channel Z for instance, is used as service channel over which the call detector located in the exchange office exchanges information with the remote concentrator. The call detector is connected through a trunk to the space switching stage in the concentrator. Each one of the $m-1$ channels is assigned for the exchange of message information with one of the $(m-1)$ concentrators. Thus, channel 1 of the call detector is assigned for the exchange of information with the concentrator number 1; channel 2 is assigned for the exchange of information with the concentrator number 2; etc. Therefore, each concentrator is identified by the code of the channel assigned to it, and a concentrator code comprises 5 digits since $m=25$. The exchange of this information is carried out by a connection set up between the service channel of each one of the concentrators and the channel reserved for it in the call detector.

The call detector sends to the concentrators information relating to either a main operation (such as finding calling subscribers), or auxiliary operations (such as interrupting the performance of the main operation). One of the auxiliary operations is the called subscriber's test.

These two operations present slight differences in their performance. When a concentrator finds a subscriber line during the main operation, information relating to the found line is transmitted to the call detector in the exchange. Then the calling line is connected from the concentrator through the channel Z of the concentrator trunk to the exchange office. Next, the exchange office sets up a connection between channel Z and the channel of the call detector assigned to serve the transmitting concentrator. Thus, the call detector in the office receives information from the concentrator for carrying out a subscriber line test (detection of on-hook or off-hook conditions).

If an off-hook conditions is found, the channel Z is connected to a call register.

During an auxiliary operation, the concentrator which serves the called subscriber line tests that line for busy or idle conditions. If the called line is found to be idle, such information is sent to the call detector. Then, the idle line is connected to the office via channel Z of the called line concentrator trunk. Next, the office sets up a connection between channel Z and the channel of the trunk connected to the concentrator serving the calling subscriber line.

In other cases, if the result of the test is positive (either a lifted calling set or an idle called subscriber) the channel Z of the concentrator trunk is coupled either with a call register or with the calling subscriber. Thus, this channel Z can not thereafter be used for the exchange of information. One then must search for a new channel on the concentrator trunk, which channel may be used as a service channel. This channel is then referenced Z'.

The search procedure for finding a free channel V' on a trunk J' and the establishment of a connection between this channel and a given channel V'' on a given trunk J'' is controlled by a marking circuit associated with the switching stage. To make the search, the trunk J'' is connected to the call detector, the channel V'' on trunk J'' being reserved for the concentrator. The trunk J' connects the concentrator to the office and the channel V' is that referenced Z' in this application.

Figure 2:
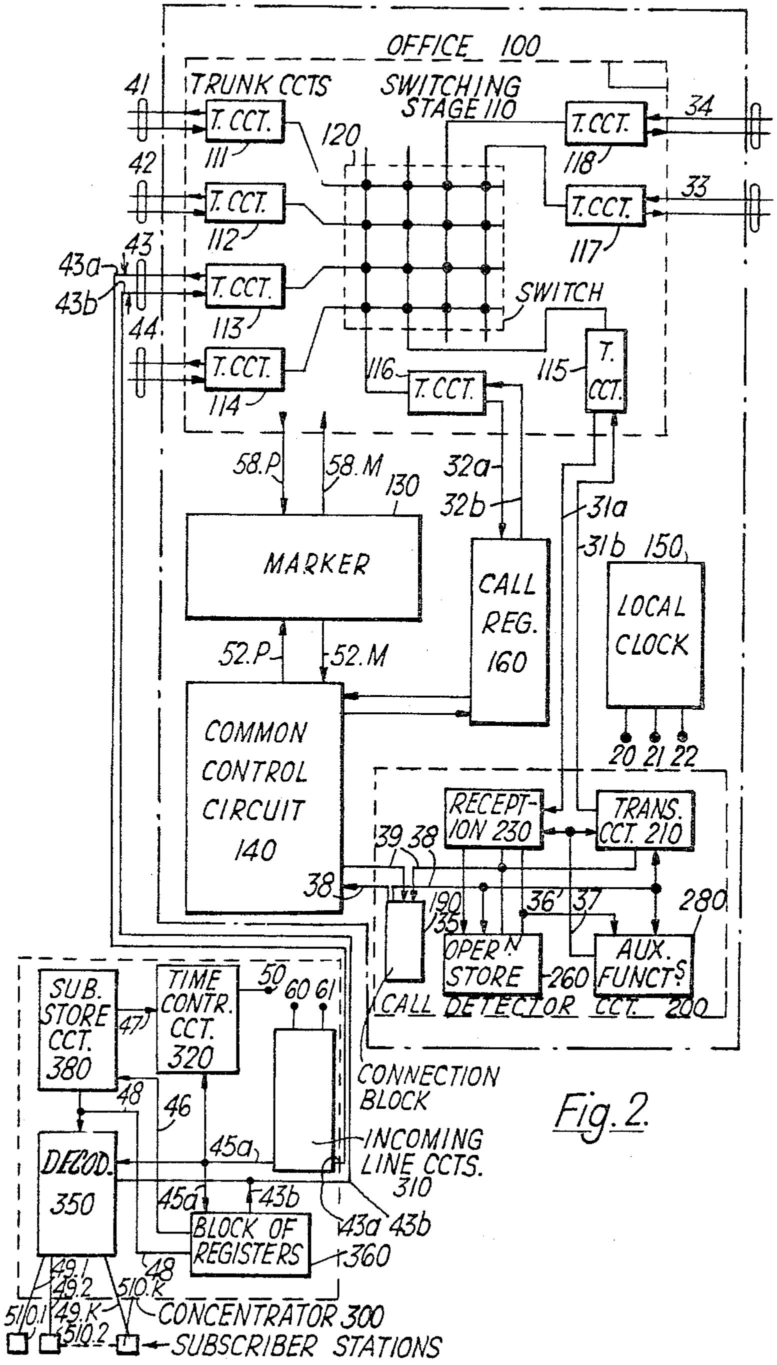
FIG. 2 is a block diagram of an office and a concentrator.

FIG. 2 is a block diagram of an office 100, one of the concentrators 300 associated with it, and a trunk line 43 extending between them.

The office 100 comprises a switching stage 110 including a switch 120 and trunk circuit 111 to 118, a marker circuit 130, a common control circuit 140, a local clock 150, a call register 160, and a call detector 200.

Switch 120 is here shown as including 4 rows, each having an individually connected trunk circuit in groups of trunks 111 to 114. In addition, switch 120 has 4 columns to which are connected the trunk circuits 115 to 118. The trunk lines connected to the circuits 111 to 114 are referenced 41 to 44, and those connected to the circuits 115 to 118 are referenced 31 to 34.

Each trunk includes two line conductors. For example, line 43b is here called an "incoming line" and line 43a is called an "outgoing line." The trunk 31 is connected to the call detector 200, the trunk 32 to the call register 160, and the trunk 43 to the concentrator 300. On each one of these trunks, the outgoing line has been referenced $a$ and the incoming line $b$. The concentrator is connected to a plurality of subscriber stations 510-1, 510-2 . . . 510-k by the subscriber lines 49-1, 49-2 . . . 49k.

*Concentrator.*—The message signals are transmitted from the office 100 over the line 43a to a group 310 of incoming line circuits in the concentrator. This incoming line circuit comprises a local clock and a retiming circuit which delivers, on its output terminal 45a, regenerated and normalized message signals having a fixed time position with respect to the digit time slot signals of the clock. This group of circuits 310 also delivers, on its output terminal 60, normal channel time slot signals, digit time slot signals, and basic time slot signals. These signals are correctly positioned with respect to the time origin set up by the local clock in circuits 310. On output 61 circuit 310 provides shifted channel time slot signals.

By inspection of FIG. 2, it is seen that a group of $k$ subscribers has access to $(m-1)$ channels appearing on trunk 43. Thus, at most $(m-1)$ subscribers may be connected to the office 100 at the same time. To carry out the necessary switchings for connecting these $k$ lines to $m-1$ channels, instructions are stored in a subscriber store circuit 380. Circuit 380 contains $m-1$ lines which are scanned cyclically responsive to channel time slot signals. Each one of these lines is assigned to a channel on trunk 43. Eventually instructions appear in one of these channels giving the code of the subscriber line assigned to that channel time slot.

These instructions indicate the time position of the call connections. An interpretation of the instructions controls the space switching device which connects the subscriber line to the trunk 43 during the indicated time position. This operation is carried out in decoding circuit 350.

The connection of a subscriber line to the office 100 is thus carried out independently when its code is stored in the subscriber store circuit. That code, of course, corresponds to the flow time position of the communication.

The storage of a new subscriber code is always carried out on the line store of the circuit 380 which corresponds to the channel which, at that time, is being used as a service channel (channel Z). This code is sent from the call detector 200 and stored in a subscriber code register in the block of registers 360. During a whole frame period, the code is compared to the subscriber codes extracted successively from the $(m-1)$ lines of the subscriber store. These codes are then transmitted from store 380 over the group of conductors 48 to the block 360. When the code is delivered during this time interval, it means that the code indicated subscriber station is busy.

Means are provided for writing, in a subscriber test register located in the block 360, the channel code on which the communication flows. When the code is not delivered, it means that the subscriber station is idle, and a zero code is written in a subscriber test register of block 360. This zero code is described as a "positive test result." In this case, the zero code stored in the subscriber code register is transferred, at a time position $tZ$, to the subscriber store 380 (over the group of conductors 46). There the code is stored in the line Z. The subscriber station characterized by this zero code is then connected to the exchange office over the channel Z of the trunk 43.

These operations are carried out under the control of the time signals applied by the time control circuit 320 over the group of conductors 50. These signals are initiated at the receipt of a subscriber code sent from the call detector 200 to the concentrator 300.

*Call detector.*—The call detector comprises the transmission block 210 whose output is connected to the outgoing line 31*b* of the trunk 31. The input of the reception block 230 is connected to the incoming line 31*a*, to an operation store circuit 260, to a block of auxiliary functions 280, and to a block of connection to the common control circuits 190.

The operations of the call detector are controlled by phase signals delivered by the exchange clock 150 over the group of conductors 22. Since a line is reserved for each concentrator in the operation store circuit 260, the result of the call detector operations is stored in a coded form in store 260. The phase signals are elaborated in a repetitive way, and a complete cycle of signals controls the execution of the main operation of calling subscriber search.

To carry out the call detector operations on all of the concentrators, an order N0 is stored in the block 280. When it is necessary to search for a called subscriber station or to identify a subscriber station connected to a given channel, the common control circuit 140 transmits an order N1 or N2 to the block 280 via conductors 38 and 39. Such an order means that a main operation has to be carried out on all of the concentrators except one which will be referenced Y. An auxiliary function operation must be performed in the Y concentrator. Thus, in logical algebra: $N0=\overline{N1}+\overline{N2}$.

To search for a called subscriber station, the code of the desired station is stored in a subscriber code register in box 210. For the performance of the two other operations, the subscriber code is delivered by a code cyclic generator which stores, at the beginning of a phase signal cycle, the subscriber code immediately higher than the code stored during the previous cycle. The register and the cyclic generator are located in the transmission block 210.

The time position $tY$ during which a called subscriber search must be carried out is marked by a signal B5, which controls the sending to the concentrator Y of the code stored in the subscriber code register. The absence of this B5 signal, or condition $\overline{B5}$, transfers the code stored by the cyclic generator to all the other concentrators. These transfers are carried out during the first phase signal which lasts two frame periods T1 and T2. The frame periods are assigned for the transmission of the first and the second halves of the code, respectively.

The signals received on the incoming line 43*a* are applied to the group of incoming line circuits 310. These signals are then transmitted over conductor 45*a* to the time control circuit 320. There a subscriber's code checking circuit searches for the characteristic that identifies each half of a subscriber's code. For example, this characteristic might be the presence of a digit 1 during each of the digit time slots 5, 6 and 7. When this characteristic is recognized, the circuit 320 delivers a signal B1 whose presence characterizes the time position $tZ$ at which this message has been received. This signal B1 initiates a cycle of time signals in the time of operations generator located in the circuit 320. Initially, this generator delivers a signal D0. If signal $\overline{B1}$, the generator delivers a signal D1 during the first frame period T'1 of an information exchange with the call detector.

The signal D1 controls the storage of a particular code, called a "marker code," on the line Z of the subscriber's store 380. During the time position $tZ$ the line Z marked by the code D1. Afterwards, the generator in circuit 320 delivers a signal D2 which covers the part of the second frame period T'2 during which the marked time signal $tZ$ appears. If a second half of subscriber's code is then received, a signal $\overline{B1}$ is sent once more. At the same time, the digits of the first half of the subscriber's code are stored in four flip-flops of the subscriber's code register. An absence of the signal $\overline{B1}$ characterizes a transmission fault, and instead of the marking code, a zero code is written on the line Z of the subscriber's store circuit 380.

When a signal $\overline{B1}$ is present, the generator in circuit 320 delivers a signal D3 which covers, in the frame periods T'2 and T'3, a time slot assigned to the busy test. This test includes all of the communication channels with the exception of the channel $tZ$. During this time interval, all of the codes of the subscriber's store are compared with the code stored in the subscriber's code register.

If the subscriber is free, the no identity signal is delivered after the comparison, and a zero code is written in a test register located in the block 360. If the subscriber is busy, the code of the channel occupied by the communication related to this subscriber is stored in the subscriber's test register.

At the time $tZ$ of the frame period T'3, the circuit 320 delivers a signal D4 which lasts only slightly more than two channel time slots and then is followed by a signal D5. This signal overlaps the frame periods T'3 and T'4 and is used during the frame period T'4, for clearing the marker code extracted from the line Z of the operation store circuit 260. The marker code is replaced by either a zero code if the subscriber is busy or the code of the subscriber if he is free.

These time signals also control the return of information from the concentrator to the call detector. Thus, the subscriber's code is returned to the call detector under the control of the signals D1, D2, D3. The code written in the test register is complemented and returned twice, successively during the frame periods T'3 and T'4 under the control respectively of the signals D4 and D5.

All of these operations are carried out in an identical way during the performance of an auxiliary function of a called subscriber test or of an identification of the subscriber connected to a given channel. The only difference is that, for the first of these auxiliary functions, the code transmitted to the concentrator Y is that written in the subscriber's code register of the call detector 260.

The reception of these codes in the call detector happens during the second phase signal which lasts 6 frame periods referenced T3 to T8.

In the continuation of the description, a concentrator on which a main operation is carried out is here designated X. A concentrator on which an auxiliary operation is carried out is here designated Y. The rows of the operation store circuit 260 which are assigned to these concentrators also carry the same references X and Y. The time slots assigned, in the call detector, for the connection with these concentrators are here designated the channel time slots *t*X and *t*Y, respectively.

The information received during each time slot is sent to code checking circuits located in the reception block 230. These circuits verify the received subscriber's code and the result of the subscriber's busy test. After each code checking concerning the concentrator X, the code extracted from the line X of the operation store 260 is modified. Thus, at the end of the checking operation, the stored code characterizes the busy test result.

A zero code, referenced S0, is stored on the lines of the operation store 260 assigned to the concentrators on which a main operation or an auxiliary operation may begin. The modifications are brought to this S0 code during the second phase signal as follows:

If the information received during the digit time slots 1 to 4 of a channel time slot is identical to the first half of the subscriber's code which has been sent at the frame period T1, this is the *t*X or *t*Y channel time slot. Then the code S0 is modified to become S1 in the corresponding line of the operation store 260. If the information received during the channel time slot *t*X or *t*Y of the following frame period is identical to the second half of a subscriber code and further if a code S1 was stored on the corresponding line of the operation store 260, this S1 code is modified to become a code S2.

The following is a description of how the concentrator X finds a calling subscriber station.

A code S2 is stored on the line X of the operation store circuit 260. Next, a code S3 and then a code S4 are written in that line if the codes received in time slot *t*X of the two following frame periods are codes "one" which indicates an idle line.

If the information received (parts of subscriber code or information transmitted from the register of the subscriber test) are not correct, or if the subscriber is busy, one of the codes S0, S1, S2 or S3 is written at the end of the fourth frame period.

The information was sent from the call detector to the concentrators during time frames T1 and T2. When taking into account transmission time on the concentrator trunk, the frame period T'1 can start no later than the frame period T3.

The concentrator sends information back to the call detector during the time frame periods T'1, T'2, T'3 and T'4. These frames correspond respectively to the frame periods T3, T4, T5, T6 set up by the exchange clock 150. Considering the transmission time over the concentrator trunk, the call detector receives the last information during the frame period T7.

The results of the code checking operations occur during time frame T8 according to the following criteria:

A code S4 is modified into a code S1 characterizing an idle subscriber.

A code S1, S2 or S3 is modified into a code S0 characterizing either a transmission fault or a busy subscriber.

At the beginning of the third phase signal, which lasts three frame periods, referenced time frames T9 to T11, a code S1 on a line of the operation store means that the subscriber station is idle. When this condition is detected, the line of the idle subscriber is connected to the trunk 43 over the channel Z. The connection is thus set up with the call detector which receives the signals transmitted from the subscriber's line during the channel time slot reserved for the exchange of information with the concentrator.

Assume that the D.C. voltage on a subscriber line 49, varies from a value V*a* to a value V*d* when the hand set is lifted. This variation of the D.C. level is detected by a line test circuit located in the reception block 230 of the call detector. Responsive thereto, a line test signal H occurs when a level higher than V*d* is detected. Each signal H controls an advance by one unit of the operation code related to the concentrator X. To avoid detection responsive to noise, the detector indicates that a subscriber's set is lifted if a signal H occurs during three successive frame periods.

During the fourth phase signal, the frame period T12, a memory stores the identity of any false calling subscriber. This store (which will be called hereafter "FC store") may be located in the common control circuit. If the network comprises $(m-1)$ concentrators, this FC store comprises $(m-1)\times k$ cells selected according to (1) the subscriber code stored in the cyclic generator and (2) the channel time slot during which the false calling signal is stored.

Assume that previously the information F was written into a cell in the FC store when the corresponding subscriber station previously transmitted a false call. During each channel time slot of the fourth phase signal, the corresponding cell sends the information F. It is then transferred from reception circuit 230 over one of the conductors 39 to the block 190 and is stored in a flip-flop. Depending upon the previous condition of this flip-flop, the output is either information F (false call) or information $\overline{F}$ (no false call).

The code extracted from the line X of the operation store circuit 260 is then modified as follows:

If a lifted handset (code S4) produces information $\overline{F}$, a finder operation is indicated and the code S4 is not modified.

If a non-lifted handset (code S1) produces the information F, an order for storing the information $\overline{F}$ is sent in time frame T13 to the common control circuit over the group of conductors 38. A code S0 is then substituted for the code S1.

A code S2 or S3 means that the line test is erroneous. If a code S4 produces the information F, it means that the subscriber's set is lifted, so that the information F is not modified. A code S0 is written on the corresponding row of the operation store circuit 260 during the time frame T12.

The fifth phase signal occurs during the frame period T13 and is reserved for the exchange of information between the call detector 200 and the common control circuit 140.

*Transfer of connection.*—The next procedure is to transfer, to a call register, the connection set up with a calling subscriber. This procedure is characterized by a code S4 written on the line X of the operation store 260. Thereafter and upon the reception of dial tone, the calling subscriber may transmit the called number to the call register. This transfer of connection corresponds to the setting up of a new connection in which the calling trunk is the trunk 43, and the called trunk is the trunk 32 connecting the block of call registers 160. According to a characteristic of the invention, the channel used on the trunk 43 is that which was used during the previous operations for the connection with the call detector, i.e. the channel Z. The only data which is not known is the channel in the call register block 160, called "call register". Since the block 160 is a trunk, it may comprise $(m-1)$ call registers or, if it is constituted by W trunks $W(m-1)$ call registers.

Assume that a circuit in the call register block 160 transmits, to the common control circuit 190, a code characterizing a free call register. This code also identifies a channel on one of the call register trunks. The free register code is stored in a particular register. Logical circuits associated with the register provide a signal PC which is transmitted to the connection block 190, when the following conditions exist simultaneously: (1) a code is stored in the register, and (2) a group of circuits, in the common control circuit 140, for working with the blocks 160 and 200 is free. The signal PC in the block 190 occurs in the channel time slot, during the fifth phase signal. This PC signal means that the common control circuit 140 may transfer information relating to a new calling subscriber from the call detector 200 to the recorder block.

It may be recalled that, at the beginning of this fifth phase signal, each new calling subscriber is identified by the following codes:

The subscriber's code stored in the cyclic generator.

The concentrator code which is the code of the channel time slot *t*X during which a code S4 is extracted from the operation store circuit 260.

The concentrators, which are referenced 1 to 24 and the corresponding rows of the operation store circuit 260, are read during time frames from *t*1 to *t*24. Thus, if there are several new calling subscribers, those connected to the concentrators bearing the lowest order numbers are successively taken over in a priority according to the possibilities of the common control circuit.

During the channel time slot *t*X of the frame period T13, if a code S4 is read in the operation store circuit 260 and if the signal PC is present in the common control block 190, this S4 code is modified into a code S5. This modification indicates that the common control circuit 140 has taken over this call. If the common control circuit 140 is busy and can not take care of any more calls, the signal PC is suppressed.

Since the new calling subscriber is identified by his subscriber's code and by the concentrator to which his line is connected, the subscriber's code stored in the cyclic generator located in the transmission unit 210 is sent to the common control circuit 140 over the group of conductors 38. The concentrator code is that of the channel time slot *t*X during which the operation is carried out. This transfer from circuit 210 to circuit 140 is controlled by a coincidence gate located in the block 190.

The new connection between the subscriber and the call register 160 is completed over the service channel Z. Thus, the concentrator can not use this channel for exchanging information with the call detector 210. This condition is indicated when a code S5 is written on the line X of the operation store circuit 260.

Later, the common control circuit 140 searches for another free service channel over the trunk 43. This search may last for a number of frame periods. When a new service channel Z' is found, a signal VL is generated in the common control circuit 140. This signal is then transmitted to the call detector 200 during the channel time slot *t*X of the first frame period T13 following its generation.

The code S5 read during this channel time slot is then modified into a code S0.

As soon as the new channel Z' has been found, the common control circuit 140 orders the marker 130 to set up a new connection between this channel Z' and the channel X of the call detector 200. Thus, a new path is set up to exchange information between the call detector 200 and the concentrator number X.

If a signal PC is not present when a code S4 is read, this code is modified into a code S0.

The sixth phase signal, set up during the time frame periods T14 to T16, indicates the end of a cycle of phase signals. During each of these frame periods T14–T16, a transmission unit of the call detector 200 sends a particular code, called the "cut-off code," to all the concentrators having a code S0 in the corresponding line of the operation store circuit 260. Thus, during a main operation, all the lines of the operation store circuit 260, contained this code S0 at this digit time slot with the exception of those lines corresponding to concentrators for which the common control circuit 140 is controlling a free channel search (code S5).

The cut-off code received by a concentrator is checked by a circuit located in the group of registers 360. If the three codes received successively are identical, a zero code is stored on the line Z of the subscriber's store circuit 380. This line contains the subscriber's code which was sent by the call detector 200 during the first phase signal of the same cycle when the subscriber was free.

If a new call has been taken over by the common control circuit 140, the marked service channel Z' is different, when the cut-off code is received, from the channel Z that was used at the beginning of the operation. The cut-off code cannot cause a breaking of the new connection set up between the calling line and the central office.

Since the operation store circuit 260 is not modified, during the sixth phase signal, it stores codes S0 and codes S5 at the end of the cycle.

One of the following auxiliary operations may be carried out in the call detector 200:

Test a called subscriber line connected to a concentrator Y. This operation lasts only one cycle of phase signals.

Identification of the subscriber talking on the channel V*o* of a concentrator Y. This operation may last from 1 to *k* cycles of phase signals. These operations are controlled respectively by order codes N1 or N2 sent from the common control circuit 140 to the call detector 200, the order being accompanied by instructions necessary for its performance. These instructions are transmitted to the connection unit 190 over the group of conductors 39.

The instructions are:

For an order N1 and for an order N2, the code of the concentrator Y which is stored in a concentrator code register located in the auxiliary function unit 280. Responsive thereto, a marking signal G2 is sent in the channel time slot *t*Y.

For the order N1, the code of the called subscriber which is written in a subscriber code register located in the block 210.

For an order N2, the channel code V*o* which is written in complement form, in a channel code register located in the block 280. For this order, the subscriber's code is that stored in the cyclic code generator.

An auxiliary operation is carried out during the first and second phase signals (T1 to T8) and, when it is completed, the results available in T8 are:

For an order N1, the "idle subscriber" code or the code of the channel on which the subscriber is talking. These codes are stored in the channel code register of the block 280.

For an order N2, the code of the subscriber which is talking on the channel V*o* of the concentrator Y. This result can occur only after a certain number of cycles of phase signals.

The results, as well as the other codes enabling the identification of the subscriber, are sent during the channel time slot *t*Y (marking signal G2) of the frame period T10 to the common control circuit 140 over the group of conductors 38. These results and codes are:

For an order N1, the codes stored in the subscriber's code register and in the channel code register.

For an order N2, the codes stored in the channel code register and in the subscriber's code cyclic generator.

To complete the identification of the subscriber, the common control circuit must also have available the concentrator code. At the end of the operation, this concentrator code is the code of the channel time slot at which the other codes are transferred to the common control circuit 140. This channel time slot code is given by the office clock 150; thus, it is not necessary to transmit it to the common control circuit 140.

The groups of conductors 38 and 39 pass through the block 190. Thus, all the code transfers between the common control circuit 140 and the blocks 210 and 280 of the call detector are controlled selectively in time frame T10 by coincidence circuits located in said block 190.

*Busy test.*—A called subscriber busy test will be described next.

A marking signal B5 is generated in time frame *tY*. This controls the transfer, to the concentrator Y, of the code stored in the subscriber's code register 360—instead of the code stored in the subscriber's code cyclic generator. This signal B5 is generated from the signal G2. Since a code S0 is stored at the beginning of the operation on the line Y of the operation store, a code S2 is stored therein if, during two successive frame periods, the received halves of the subscriber code are identical to the halves sent in time frames T1 and T2.

During the two following frame periods, the call detector receives, the code written in the subscriber test register 360 of the concentrator. This code is the complement of the code zero, or complement of the code of the channel on which this subscriber is in communication. The code received during the first of these frame periods is stored in the channel code register. The code S3 is stored on the line Y of the operation store circuit 260. If the code received during the second of these frame periods is identical to that stored in the channel code register, the code S4 is stored on the line Y.

The called line is idle if, during time frame T8, the channel code register contains a code one (complement of the code zero) when a code S4 is stored on this line Y. Since this means that the subscriber is free, the code S5 is stored on the line Y of the operation store circuit 260. In all the other cases, the code S0 is stored therein.

When a code S5 is stored on the line Y, the circuits operate as if an order N0 had occurred, except that here the information is transferred to the common control circuit 140 during the time frame T10.

To identify the subscriber in communication on the channel *Vo* of the concentrator Y, all concentrators connected to detector 200 conduct a line finding search. When the code S2 is stored on the line Y, the codes received during the two next frame periods are compared to the code stored in the channel code register. This comparison occurs during the channel time slot *tY* defined by the signal G2. If two coincidences are detected, the codes S3 and S4 are stored successively on the line Y. When a code S4 is stored, it means that the code stored in the cyclic generator is the code searched for and a signal G3 is generated to indicate an "end of operation." In time frame T10, this signal controls the transfer of the information from the concentrator to the common control circuit 140. In time frame T8, the code S0 is stored on the line Y whatever may be the result of the operation. This identification of the subscriber *ko*, should last for *k* cycles of phase signals since one single subscriber is tested during one cycle of phase signals.

DETAILED DESCRIPTION

The operation of the circuits of a concentrator and of the call detector will be described now in detail. Beginning with the description of a concentrator the detailed diagram is shown on the FIGS. 3–6.

Figure 3:
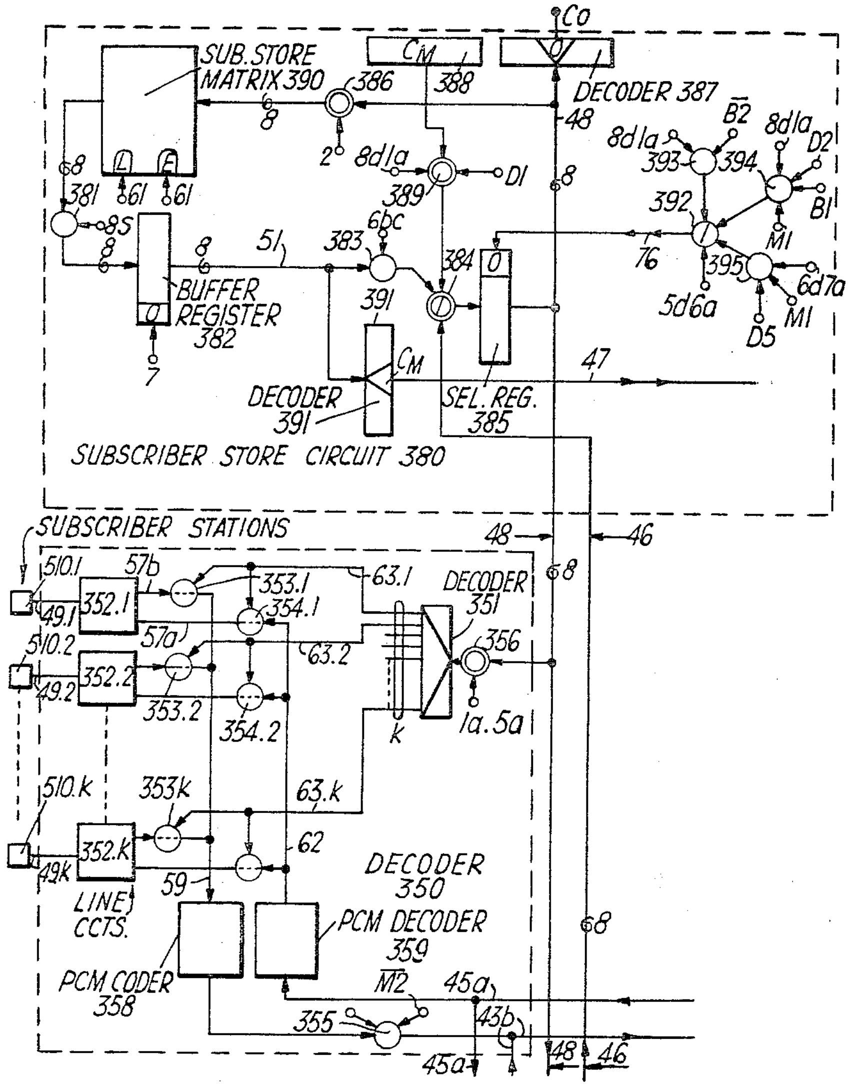
FIG. 3 is a logic diagram of a group of subscriber line circuits and a part of a subscriber store circuit located in a concentrator.

The time connections of subscriber's lines to the channels of the trunk connecting a concentrator to the office are controlled from instructions stored in the subscriber's store 380 (FIG. 3). The connections are performed in the decoder 350.

The *k* subscriber sets 510/1, 510/2 . . . 510/*k* associated to the concentrator are connected to the subscriber lines 49/1, 49/2 . . . 49/*k*. These lines are connected to the line circuits 352/1, 352/2 . . . 352/*k*. Each one of these line circuits, comprises an outgoing line 57*b* on which are transmitted the voice frequency signals coming from the subscriber's set and an incoming line 57*a* on which are transmitted the voice frequency signals flowing to the subscriber set.

The positions "on-hook" and "off-hook" conditions are characterized by D.C. voltage variations on the subscriber's line. The on-hook voltages are referenced V*a* and the off-hook voltages V*d*. By way of example, $Vd > Va$, the sign ">" meaning "more positive than."

The *k* subscribers have access to the trunk lines 45*a* and 43*b* which connect the concentrator to the exchange office. Access is given via AND gates referenced 353 and 354.

Each outgoing line of a line circuit is connected to the signal input of an AND gate 353/1, 353/2 . . . 353/*k*. The outputs of these gates are connected to the input of the circuit 358 by means of the conductor 59.

Each incoming line of a line circuit is connected to the output of an AND gate 354/1, 354/2 . . . 354/*k* which receives its signals from the circuit 359 via its output 62.

One input of each of the two AND gates associated to a line circuit is energized from the decoder 351 which has *k* outputs 63/1, 63/2 . . . 63/*k*. When a signal appears on the output 63/1 for instance, the gates 353/1 and 354/1 are simultaneously activated. Thus, any voice frequency signals present on the line 57*b* are transmitted to the line 57*a*.

For networks operating in pulse code modulation, the circuits 358 and 359 are respectively the coder and the decoder. These circuits may be associated respectively with a compressor and an expander.

The duration of a signal on conductor 63 is shorter than a channel time slot in order to avoid crosstalk between amplitude modulated pulses circulating on the conductors 59 and 62 and on adjacent channels. This duration is four digit time slots, and is controlled by the multiple AND circuit 356 which is activated during the time slot 1*a* to 5*a* of each channel time slot.

Figure 8:
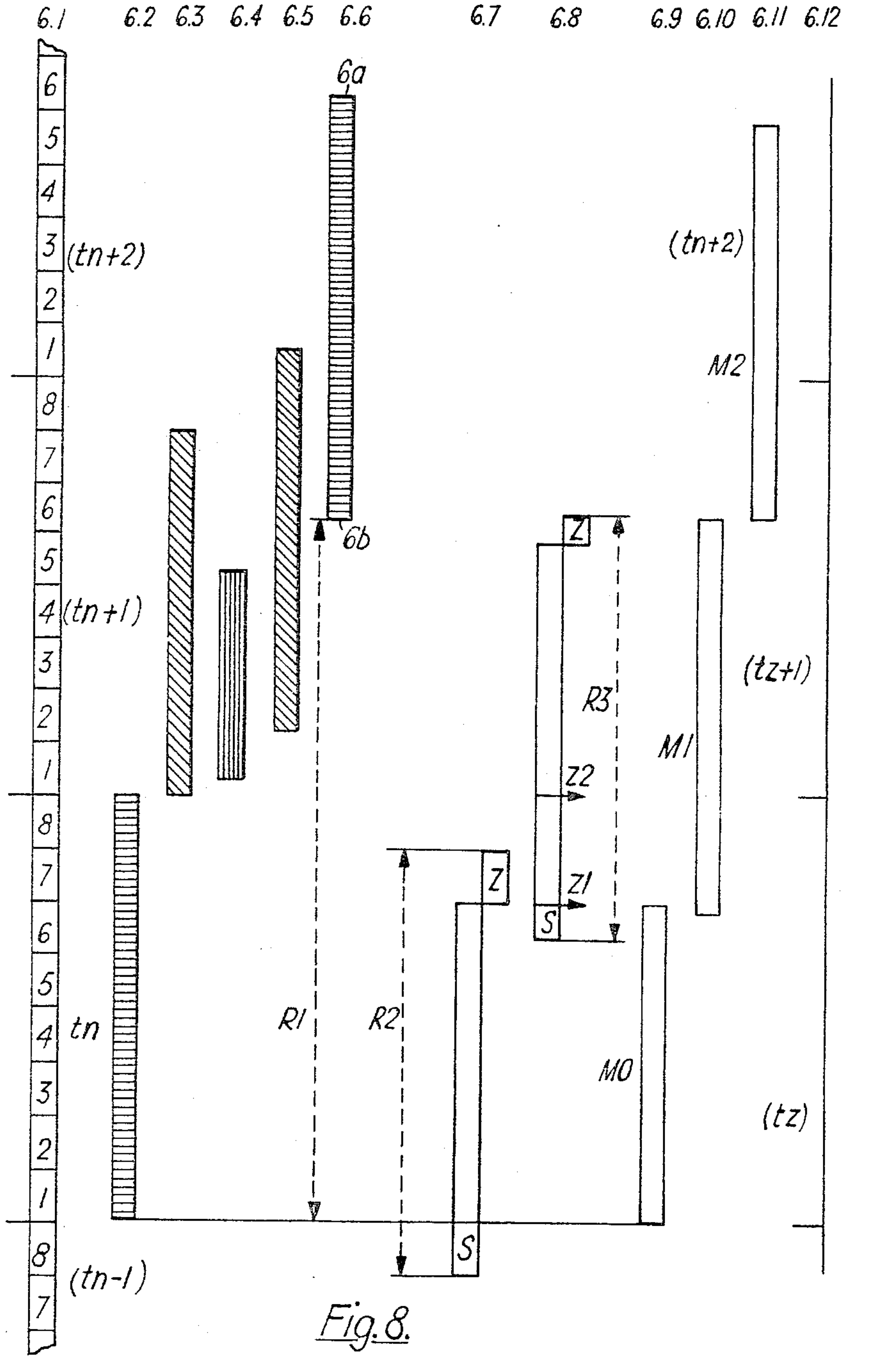
FIG. 8 is a first timing diagram related to signals which are present in the concentrator.

FIG. 8 diagrams some of the signals in the concentrator. Successive channel time slots referenced $(tn-1)$, $(tn)$, $(tn+1)$ and $(tn+2)$ are shown at the top of FIG. 8.

The concentrator clock synchronizes the message signals arriving at the concentrator. Thus, a message coming from the office on the channel *n* of the trunk occupies the normal channel time slot *tn* set up by the said clock. The time slot imparted to the eight digit time slots of this message are represented at 6.2 by a rectangle occupying the channel time slot *tn*. The opening time of the speech gates 353 and 354 are shown at 6.4 by a rectangle having a duration 1*a*–5*a* in the channel time slot $(tn+1)$.

The time lag between the time of reception of the message 6.2 and the time of activation of the speech gates 6.4 occurs because different message signals are applied in time succession to the input of the decoder 359. Decoder 359 can deliver an exact analog signal only after termination of the digit time slot $7(tn)$. This analog signal is stored on a capacitor which is charged only at the end of the digit time slot $8(tn)$. The time during which this capacitor charges corresponds to the value of the received message and is shown by a rectangle 6.3 of duration $1–7(tn+1)$. Thus, the activation time of the speech gates lies inside time slot $tn+1$.

The voice frequency signal coming from the line circuit 352 must be transmitted, after coding, on the channel *n* of the outgoing line. This voice signal is sampled by the speech gate 353 operating under control of decoder 351. The exemplary decoder 351 (FIG. 3) has 255 different output conductors, one of which drives gate 353. The result is an amplitude modulated pulse of a duration 1a–5a(tn+1). This pulse is transmitted to the PCM coder 358, and if this coder is of the "feedback" type, the AM pulse is stored on a capacitor at time 2b (6.5, FIG. 8).

The transmission time of the seven digits of the coded message is shown at 6.6 (FIG. 8). The beginning of the channel time slot on the outgoing line is located at 6b(tn+1) and the channel end at 6a(tn+2). This time slot overlaps but does not wholly coincide with the capacitor charge time 6.5. Thus, a second capacitor receives and stores the charge of the first capacitor during all the transmission time shown at 6.6.

The time lag R1, between the beginning of the first digit time slot tn on the incoming line and the beginning of the first digit time slot 6a of the outgoing line is slightly more than thirteen digit time slots.

A signal appears on one of the output terminals of the decoder 351 (FIG. 3) when a subscriber's code is read out, at the beginning of the time slot tn, from the store matrix 390 located in the subscriber store 380. This matrix comprises m—1 lines which are activated for cyclic reading by shifted channel time slot signals. This shifting time slot signal is shown symbolically by the arrow 61 ending in a letter "L" surrounded by a circle. The line n of matrix 390 is thus activated by a shifted channel time slot signal t'n which leads the signal tn by half a channel time slot. The subscriber's code extracted from this line n is stored in the buffer register 382. Storage occurs via the AND circuit 381 during the digit time slot 8, i.e. in 8(tn—1). The register 382 is reset to zero during each digit time slot 7. Thus, the subscriber's code remains stored in register 382 from the beginning of the time tn.1 until the end of the time tn.6, 6.7 (FIG. 8). The letter "S" indicates when the AND circuit 381 conducts. The letter "Z" indicates when the register 382 is cleared of its signal.

This Z code is transmitted to the selection register 385 by the activation of the AND gate 383 in time slot 6bc. Register 385 is reset to zero by the various logical circuits 392, 393, 394, 395, as indicated by the following logical equation:

$$5d6a+8d1a\times\overline{B2}+M1(8d1a\times D2\times B1+6d7a\times D5) \quad [1]$$

The first term (5d6a) corresponds to a normal clearing procedure so that the code is stored in register 385 during the time interval 6c(tn)–5c(tn+1); 6.8 (FIG. 8).

By comparing 6.7 and 6.8, it is seen that the storage durations R2 and R3 for channel n in the registers 382, 385 are slightly shorter than a channel time slot. Moreover, the stored instruction is available during the time interval 1(tn)–5c(tn+1). The instruction related to the channel (n+1) is stored in the buffer register 382 during most of the storage time of the instruction n in the selection register 385.

The code stored in the selection register 385 is rewritten in the matrix 390 via conductors 48. The line for storage in matrix 390 is selected by shifted channel time slot signals applied on the input E. However, since the instruction extracted from the line n at time (tn) must be rewritten on the same line at time (tn+1), the line n is activated by the signal (t'n+1), the line n+1 by the signal (t'n+2) etc. The rewritten storage occurs during the digit time slot 2 of the channel time slot via AND circuit 386. The conductors 48 also connect to a decoder 387 which delivers a signal Co when a zero code is stored in the register 385.

Last, the code stored in the register 382 is applied to a decoder 391 which delivers a signal Mo on its output 47 when the channel Z code is stored therein.

A register 388 permanently stores this channel Z marking code, which is sent to the register 385 via the AND circuit 389. A code received from the circuit 360 (FIG. 6) over conductors 46 can also be stored in register 385. The conditions controlling these transfers will be studied further on.

Through the group of conductors 48 (FIG. 3), the instruction n controls the subscriber's selection. At the same time, the instruction (n+1) is sent to block 360 (FIG. 6) over conductors 48, and to the decoder 391.

Figure 5:
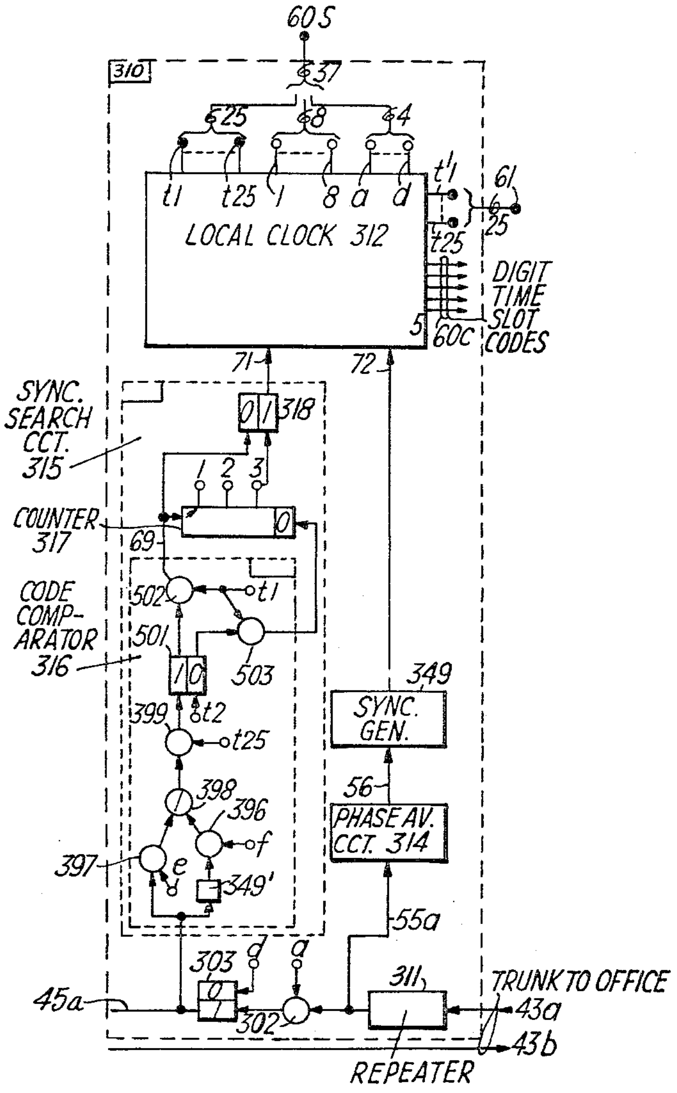

The operation of the time circuits of a concentrator are shown in FIG. 5 where block 310 serves the incoming line circuits. The message signals are applied to these circuits as they are received on the incoming line of the concentrator. First, the line circuits extract synchronization information from the message signals. Responsive thereto, a local clock 312 provides different time signals. Second, the local clock synchronizes the channels, i.e., to the channel time slot signal t25 delivered by the clock 312 is forced to coincide with the corresponding time slot transmitted by the office.

The time fluctuations caused by trunk line transmission are overcome by a prior invention wherein circuits store the message signals in a "data store" associated with each of the trunk circuits incoming from the office. In this manner, all incoming signals are read under the control of time signals delivered by a single clock.

This enables a simplified pulse synchronization. The block 310 operates this way. A repeater 311 receives signals appearing on the incoming line 43a. At output 55a, repeater 311 regenerates signals having a duration of approximately two basic time slots, such as 250 ns. These regenerated signals are applied to a phase averaging circuit 314 and to the AND circuit 302.

On output 56 of circuit 314 a, sinusoidal signal appears at the average frequency of the message signals, which is 2 mc. The phase of these message signals is changed by a fixed quantity with respect to the input signals on conductor 55a. The signals appearing on the conductor 56 are applied to a synchronization generator 349 which includes a frequency quadrupler stage, followed by an oscillator synchronized by the signals delivered by said quadrupler. The average frequency of the oscillator in block 349, thus fluctuates around its rated value which is 8 mc. This fluctuation is according to the fluctuations of the input signals on conductor 56. The signals which block 349 deliver on output conductor 72 are phase shifted by a constant value with respect to the input signals. The output signals on conductor 72 are thus applied to the clock 312.

Clock 312 includes a chain of three counters connected in series which are driven by signals on conductor 72. These counters (not shown) comprise respectively 4, 8 and 25 positions. Thus, they store respectively the codes of the basic time slots a, b, c, d, digit time slots 1 to 8 and channel time slots t1 to t25. The digit time slot and channel time slot codes appear on conductors 60C. These codes also appear on the group of 37 conductors 60S. Time delay circuits shift channel time slot signals which appear on conductors 61.

The time delays caused by the circuits 314 and 349 were constant. Thus, by adding another delay, the channel time slot signal a is centered on the regenerated signal 55a and the AND circuit 302 is activated each time that a signal is delivered by the repeater 311. On the other hand, the clock 312 includes a circuit for controlling the advance of the channel time slot counter. Hence, the leading edge of a digit time slot signal always coincide with the leading edge of the basic time slot signal a and any slight instantaneous variations of the frequency of the oscillator 349 are minimized.

The output of the AND circuit 302 resets a flip-flop 303 to its 0 state during the basic time slot d. This flip-flop is in the 1 state during the preceding basic time slots b and c. Therefore, the signal appears on the trunk conductor 45a during the b and c slots when the output of flip-flop 303 is "1." This "1" state represents a normalized message signal of a duration of 250 ns. These signals on trunk line 45a are applied to the synchronization search circuit 315. This circuit comprises a code comparator 316, a non-coincidence counter 317, and a flip-flop 318.

When set to the 1 state, the flip-flop 318 applies a signal to conductor 71 and the clock 312.

The code comparator 316 is activated by the channel time slot signal *t25* which is the time interval when the synchronization code should be received on the incoming line 43*a*. The comparator comprises AND circuits 396, 397, 399; OR circuit 398, inverter 349, and flip-flop 501. This flip-flop is reset at the time *t2*. The AND circuits 396 and 397 compare, in series form, the codes received at the concentrator with the synchronization code. The synchronizing code energizes the inputs *e* and *f*. For example, if a digit of rank 1 of the synchronization code must be 1, a signal is applied at the input *f* of the AND circuit 396 during the digit time slot 1. If a digit 1 is received during this time interval, the inverter 349' does not deliver any signal, the AND circuit 396 is blocked and flip-flop 501 remains in its 0 state. In the same way, if a digit of rank 4 must be a 0, a signal is applied at the input *e* of the AND circuit 397 during the digit time slot 4. If a digit 1 is received during this time interval, the AND circuit is activated and the flip-flop 501 sets to its 1 state.

If the flip-flop 501 is in the 1 state at the end of the time slot *t25*, it means that the code received during the channel time slot is not identical to the synchronization code. Since the error could result from a transient disturbance, this information is applied to the non-coincidence counter 31 via the AND circuit 502 during time *t1*. This counter has three positions and is reset at each time *t1* if the flip-flop 501 is in the 0 state. (Reset is via the AND circuit 503.) Thus, counter 317 reaches its position 3 only after three non-successive coincidences which indicates a loss of synchronization. If counter 317 reaches the position 3, the flip-flop 318 is reset by the signal delivered by the AND circuit 502. The output 1 of this flip-flop is connected, by means of the conductor 71, to the clock 312. Thus, a signal is present on this conductor when the synchronization code has not been detected during a time slot *t25* during three successive frame periods. This conductor 71 signal controls the advance of the digit counter of the clock. This shifts, by one digit time slot, the whole spectrum of the time signals supplied by the clock. The signal *t25* will thus be shifted digit by one digit time slot at each signal on conductor 71. The search time of the synchronization code will be at most 200 frame periods since there are 200 digit time slots in a frame period.

Figure 4:
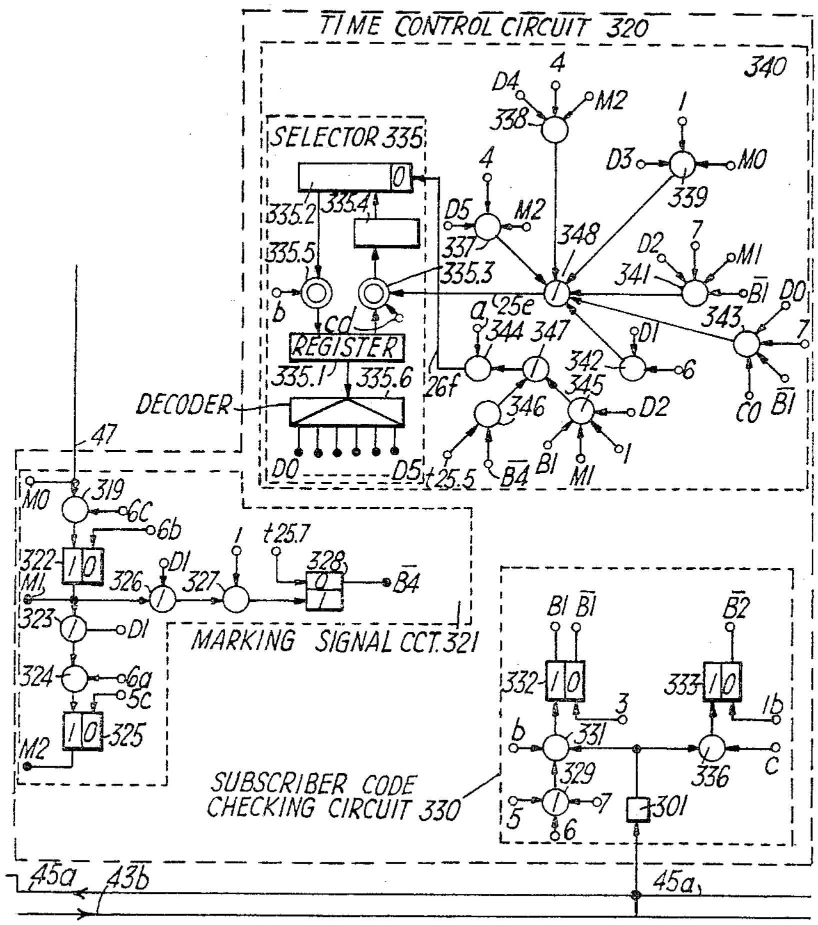
FIGS. 4 and 5 are a logic diagram (when joined) of a retiming circuit, and of a time control circuit.

FIG. 4 also comprises the time control circuit 320 which includes the following elements:

A marking signal circuit 321 which comprises an input 47 and which delivers signals M0, M1, M2, $\overline{B4}$.

The group of subscriber's code checking circuits 330 which receives the normalized message signals on input 45*a* and which delivers signals B1, $\overline{B1}$ and B2.

A generator of operation time signals 340 which delivers signals D0–D5 in accordance with the signals delivered by the circuits 321 and 330. These three circuits 321, 330, and 340 also use time signals 60S delivered by the clock 312 (FIG. 5).

In the above study of the circuits 350 and 380 (FIG. 3), consideration was given to the finder operation for setting up a connection between a subscriber connected to the concentrator and another subscriber. The channel time slot *tn* considered in that study was related to one of the channels on the trunk 43. During the description of the FIG. 2, it was noted that one of the ($m-1$) channels on this trunk 43, the channel Z, is reserved as a service channel. Information is exchanged between the concentrator and the call detector over this channel Z. Thus, this trunk carries only ($m-2$) communication channels and one service channel Z.

The time control circuit 320 delivers signals which control the exchange of information between the concentrator and the call detector. These signals are thus used only during the marked channel time slot, *tZ*. The marking signal circuit 321 comprises the AND circuits 319, 324 and 327; the OR circuits 323 and 326; the flip-flops 322 reset by a time signal 6*b*, 325 reset in time position 5*c*, and 328 reset in time position *t*25.7. It is assumed that it takes at most one basic time slot to change the state of these flip-flops.

A signal M0 is present on the input 47, when the marking code is stored in the buffer register 382 (FIG. 3). The presence of this M0 signal indicates the receipt of a series of digits representing half of a subscriber's code plus three digits 1. This code is received between the digit time slots 1 to 8 of a given channel time slot. This channel time slot is time slot *tZ*. The duration of the signal M0 is less than that of the time slot *tZ*, and part of the channel time slots (*tZ*), ($tZ+1$) and ($tZ+2$) is covered by marking signals M1 and M2 which also have a duration shorter than eight digit time slots.

To provide a common time scale, these and other signals, delivered by the circuit 320, are described with respect to the time scale 6.12 (FIG. 8). Thus, a signal M0 6.9 is present during the time interval 1*a*–6*d* (*t*Z).

The resetting of the flip-flop 322 (FIG. 4) is controlled at time 6*b*. The AND circuit 319 is activated at time 6*c*. Thus, when an M0 signal is present, it is applied at the input 1 of this flip-flop in time position 6*c* (*t*Z). Immediately thereafter, it is cancelled.

The flip-flop 322 delivers an M1 signal starting at the latest in time position 6*d* (*t*Z) and is set up during the time interval 6*d*(*t*Z)–6*a*($tZ+1$) (6.10, FIG. 8). This M1 signal may be considered as a continuation of the signal M0. Note that a part of this M1 signal coincides with the time during which a subscriber line is selected (see 6.4). The subscriber line is connected to time frame *t*Z.

This signal M1 is applied to the input 1 of the flip-flop 325 at the first time frame 6*a* after it occurs. This is at time 6*a*($tZ+1$), and occurs by the activation of the AND circuit 324. The flip-flop 325 delivers a signal M2 starting at the latest in time position 6*b*($tZ+1$) and continuing during the time intervals 6*b*($tZ+1$)–5*b*($tZ+2$) (see 6.11). A signal M2 may also be produced during the same time interval under the control of an operation time signal D1 applied to the OR circuit 323 at the time 6*a*($tZ+1$). A signal D1 applied to the OR circuit 326 controls also the setting of the flip-flop 328. This condition will be studied further on.

By comparing the graphs 6.11 and 6.6, it is seen that the signal M2 coincides with the time reserved, on the output channel, for the transfer of the first seven digits of a message. On the other hand, the signal M1 is applied to the 1 input of the flip-flop 328 by the activation, in time period 1($tZ+1$), of the AND circuit 327. This flip-flop 328 is reset at time *t*25.7 so that it is in the 1 state (condition B4) between the times 1($tZ+1$) and *t*25.7 of a frame period during which a signal M1 is present.

The subscriber's code checking circuit 330 comprises the OR circuit 329, AND circuit 331, flip-flop 332 (reset in time position 3), and the cut-off code checking circuit (AND circuit 336, flip-flop 333 reset in time position 1*b*).

As explained during the description of FIG. 2, a subscriber's code is sent from the call detector over trunk 43 to the concentrators during two successive repetition periods. The first four digits are sent during the frame period T1 and the last four digits during the frame period T2. In the office, digits 1 are placed in the digit time slots 5, 6 and 7 for recognizing these codes.

A cut-off code, the digit 1, may be sent from the call detector to reset a subscriber code register located on the line Z of the subscriber's store matrix 390 (FIG. 3). It is necessary to recognize this code. To do this, the signals appearing on the line 45*a* are applied through the inverter 301 (FIG. 4) to the group of circuits 330. The inverter delivers a signal only when it is receiving a digit 0. The flip-flop 332 delivers a signal B1 for the logical condition $(5+6+7)xb$. This flip-flop begins to deliver a signal $\overline{B1}$ at digit time slot 3, and if it is still delivering this signal during a time interval included between the time $7c$ of a channel time slot and the time $2d$ of the following channel time slot, it indicates that the concentrator has received one half of a subsrciber's code. By calling $tm'$ the channel time slot for reception of the code, the condition B1 is present during the time interval $7c(tm')-2d(tm'+1)$.

The flip-flop 333 sets at its 1 state during the interval established by two signals $1b$ if a digit 0 has been received on the line 45*a*. Thus, it delivers a signal $\overline{B2}$ on its output 0 only if such a digit 0 has received. Eight digits 1 in a time interval $1c-8c$ (delimited by the AND circuit 336) of a channel time slot is here referenced $tm''$. To indicate a cut-off code, such a signal $\overline{B2}$ may be used during the time interval $8d(tm'')-1a(tm''+1)$.

The time generator 340 (FIG. 4) comprises a selector 335, and several AND and OR circuits. These circuits deliver counter advance signals *e* over the conductor 25*e* and clearing signals over the conductor 26*f*.

The selector 335 comprises a register 335–1 with which is associated a six output D0 to D5 decoder 335–6. When the multiple AND circuit 335–3 is activated by a time slot signal *cd* and by a signal *e*, a number stored in the register 335–1 is transmitted to the logical decoder unit 335–4. On its output conductors, the decoder sends the code immediately higher than the code applied to its input terminals. Thus, if the code D1 is received from the register, it is transformed into a code D2 and is stored in the register 335–2. The code D2 is transformed into a code D3, and the code D5 is transformed into a code D0, etc. At time *cd*, the new code is stored in the register 335–2. At the time slot *b*, the new code is transferred in the register 335–1 by the activation of the multiple AND circuit 335–5.

A clearing signal *f* may be applied via AND circuit 335 to the register 335–2 during the time slot *a*. Thus, during a new code stored in register *cd* may be replaced, at time *a* of the following digit time slot, by a zero code which is transmitted in time *b* to the register 335–1 in order to select the output D0 of the decoder 335–6. Here a counter uses two registers so that a delay occurs between the time when the signals are applied to the AND circuits 337, 338, 339, etc. and the time of selection of an output of the decoder. Thus, for instance, the AND circuit 338 is activated for the logical condition D4x4xM2. The AND circuit 335–3 is activated in time *cd*, i.e. in time 4*cd*.

The code stored in the register 335–1, the code D4, is thus transmitted to the logical unit in time 4 *cd* and the new code, D5, is stored in the register 335–2. This code D5 is transmitted to the register 335–1 via AND circuit 335–5 during the basic time slot *b*, viz. in 5*b*. If it is assumed that the delay between the activation of this AND circuit and the selection of the output of the decoder 335–6 equals one basic time slot, the output D5 will be selected in time 5*c*. The advance signal is delivered by the OR circuit 348 during the digit time slot 4.

The first phase signal controlled the transmission to the concentrator, during time frames T1 and T2, of a subscriber's code. The first half of this subscriber's code marks the channel time slit *tZ* and initiates the cycle of time signals in the time control circuit 320. Moreover, these time signals caused the subscriber's test (idle or busy subscriber) and second the transmission, to the call detector, of the result of this test.

Figure 9:
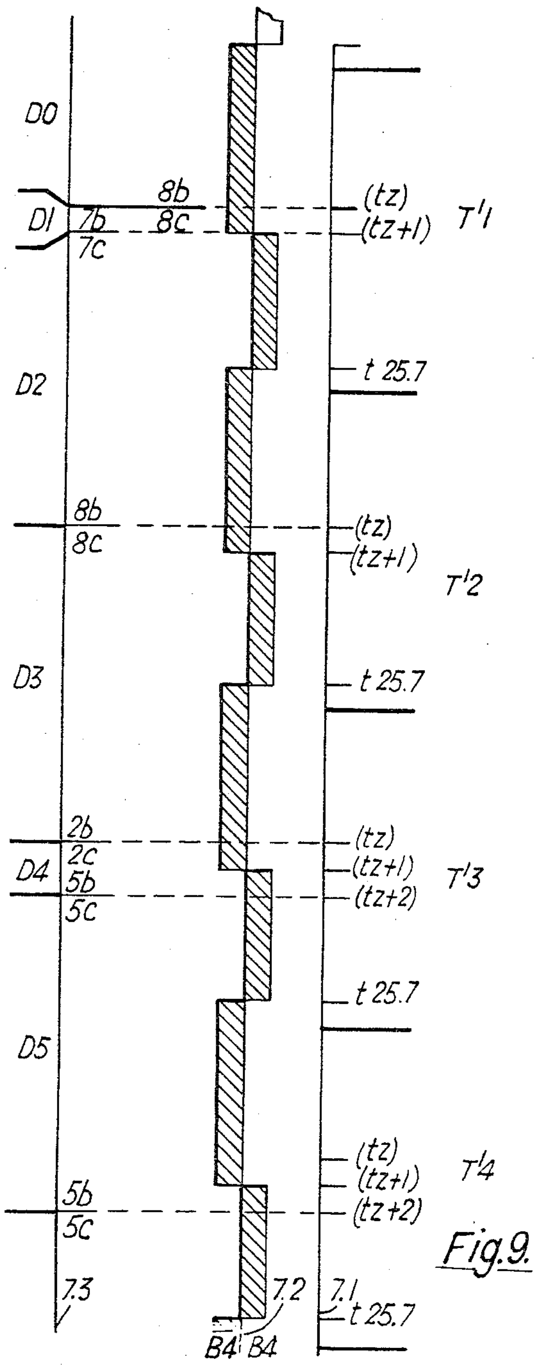
FIG. 9 is a second timing diagram of signals.

The cycle of time signals comprises 5 signals D1, D2, D3, D4 and D5 which are distributed, in time successive over 4 frame periods. These four frame periods referenced T'1, T'2, T'3 and T'4 are shown at 7.1 (FIG. 9).

It is assumed that the decoder 335 (FIG. 4) initially delivers a signal on its output D0. This means that the concentrator waits for the reception of the first half of a subscriber's code coming from the call detector. The reception of this code is characterized by the presence of a signal D1 starting from a time 7*c*. The advance signals are produced as follows:

(1) $D0x7x\overline{B1}xC0=e$ (by the logical circuits 343, 348) and the decoder delivers a signal on its output D1. Since the signal $\overline{B1}$ characterizes the channel time slot $(tZ)$, the signal D1 starts no later than time 8*c* of the channel time slot $(tZ)$ during the first frame period T'1 of the operation 7.3 (FIG. 9). This time is written $8c(tZ)/T'1$.

The additional condition C0 indicates that the line Z of the subscriber's store 390 (FIG. 3) contains a zero code. That is, the code has been recognized and has been transmitted on a free channel. It does not concern a communication.

In the circuit 380 (FIG. 3), the marking code delivered by the register 388 is stored in the selection register 385 by the condition $8d1axD1$, i.e. since the beginning of the time D1. This marking code is transferred via AND circuit 386 to the line Z of the matrix 390 during the next following digit time slot 2.

(2) $D1x6=e$ (by the logical circuits 342, 348) and the decoder delivers a signal on its output D2.

The signal D1 is thus set up during a time interval of seven digit time slots $8c[(tZ)-7b.(tZ+1)/T'1]$. It is seen that the signal D1 appears within the frame period T'1.

(3) $D2x7xM1x\overline{B1}=e$ (by the logical circuits 341 and 348) and the decoder delivers a signal on its output D3. This passage to D3 happens when the following conditions occur simultaneously:

Signal M1 is set up during the digit time slot $7(tZ)$ if a marking code is written on the line Z of the subscriber's store 390 (FIG. 3).

Digit time slot 7 which is the digit time slot $7(tZ)$.

Condition B1, i.e. reception of the second part of the subscriber's code, the information being available in time position 7*cd*.

The signal D1 started in time position $7c(tZ+1)/T'1$ and enabled the storage of the marking code on the line Z of the subscriber's store matrix 390. This code cannot now be detected by the decoder 391 (FIG. 3) and can initiate the signal M1 only at the following frame period T'2 as indicated at 7.3 (FIG. 9).

The signal D2 is thus set up during the time interval $7c(tZ+1)/T'1-8b(tZ)/T'2$. The shift to D3 thereafter occurs only if the second part of the subscriber's code is received.

(4) $D3x1xM0=e$ (by the logical circuits 339 and 348) and the decoder delivers a signal on its output D4.

Th signal M0, which characterizes the storage of a marking code in the register 382 (FIG. 3), is cleared when the signal M1 is set up (6.9 and 6.10), FIG. 8. The coincidence $D3xM0$ can only take place during the following frame period, i.e. in time position T'3. As seen in 6.9 (FIG. 8) the signal M0 comprises a digit time slot 1. The signal D3 is thus set up during the time interval $8c(tZ)/T'2-2b(tZ)/T'3$.

(5) $D4x4xM2=e$ (by the logical circuits 338 and 348) and the decoder delivers a signal on its output D5. As seen at 6.11 (FIG. 8) the signal M2 comprises a digit time slot 4. Thus, the signal D4 appears during the time interval $2c(tZ)/T'3-5b(tZ+2)/T'3$.

(6) $D5x4xM2=e$ (by the logical circuits 337 and 348) and the decoder delivers a signal on its output D0. The signal D5 starts in time position $5c(tZ+2)$. The signal M2 related to a given frame period ended in time position $5b(tZ+2)$. The signal related to the frame period T'3 cannot thus coincide with a signal D5. This shifting to D0 can take place only in time position T'4 and the signal D5 appears during the time interval $5c(tZ+2)/T'3-5b(tZ+2)/T'4$, 7.3 (FIG. 9).

The duration of the signals M0, M1, M2, $\overline{B1}$, $\overline{B2}$, D0, D1, D2, D3, D4, D5, as well as the storage duration in the registers 382–385 are given in the Table I.

TABLE I

| | |
|---|---|
| M0 | $1a(tZ)-6d(tZ)$. |
| M1 | $6d(tZ)-6a(tZ+1)$. |
| $\overline{M2}$ | $6b(tZ+1)-5b(tZ+2)$. |
| $\overline{B1}$ | $7c(tm')-2d(tm'+1)$ |
| $\overline{B2}$ | $8d(tm'')-1a(tm''+1)$ |
| B4 | $1(tZ+1)-t25.7$ |
| D0 | Up to $8b(tZ)/T'1$. |
| D1 | $8c(tZ)-7b(tZ+1)/T'1$. |
| D2 | $7c(tZ+1)/T'1-8b(tZ)/T'2$. |
| D3 | $8c(tZ)/T'2-2b(tZ)/T'3$. |
| D4 | $2c(tZ)/T'3-5b(tZ+2)/T'3$. |
| D5 | $5c(tZ+2)/T'3-5b(tZ+2)/T'4$. |
| Register 382 | $1a-6d(tZ)$ and $(1a-6d)tn$. |
| Register 385 and C0 | $6c(tZ)-5c(tZ+1)$ and $6c(tn)-5c(tn+1)$. |

In the same way that the selection of an output of the decoder is delayed with respect to the advance signal which initiates it, the selection of the output D0 is delayed with respect to the clearing signal delivered at the basic time slot *a* by the AND circuit 344. This selection is carried out at the basic time slot *c* and the delay is thus of two basic time slots.

The clearing signals are delivered by the OR circuit 347 which receives the signals delivered by the AND circuits 345 and 346.

The AND circuit 345 is activated for the condition $D2x1xM1xB1$. Since the signal M1 is present during the time interval $6d(tZ)-6c(tZ+1)$ 6.10 (FIG. 8) and a signal B1 from a digit time slot 5 to the digit time slot 2 of the following channel time slot, this AND circuit 345 delivers a signal in time position $1(tZ+2)/T'1$ (see Table I and note the duration of the signal D2). The output D0 of the selector 335–6 is selected from the time $1c(tZ+2)/T'1$. This clearing means that the message received during the time D2 is not the second part of a subscriber's code.

The AND circuit 346 is activated for the logical condition $t25.5x\overline{B4}$. During the study of the circuit 321 (FIG. 4) it was noted that the condition B4 appears during each one of the frame periods T'2, T'3, T'4 when a marking code is detected, between the times $1(tZ+1)$ and $t25.7$ of the frame period.

The flip-flop 328 may be switched to its 1 state under the action of a time signal D1. This D1 signal appears during the time interval $8c(tZ)-7b(tZ+1)/T'1$ and the signal B4 appears during the time interval $1(tZ+1)-t25.7/T'1$. The graph 7.2 (FIG. 9) shows that the condition $\overline{B4}$ is set up permanently. It is cancelled only from the time $1(tZ+1)$ to the time $t25.7$ of each one of the frame periods T'1 to T'4.

The selector 335 is thus reset to zero at the time $t25.5$ of each frame period except during the frame periods T'1 to T'4.

Figure 6:
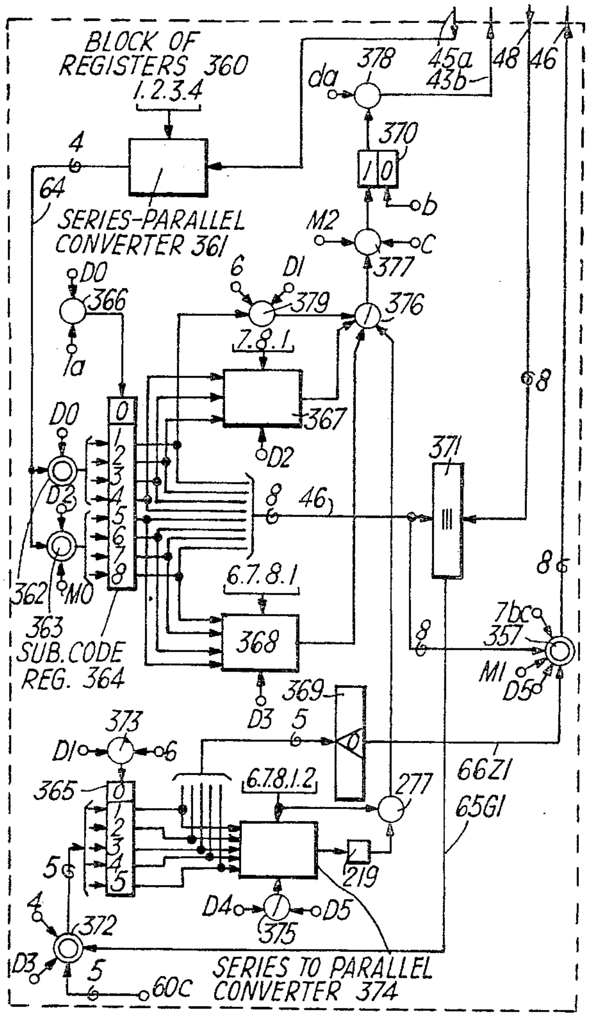
FIG. 6 is a logic diagram of a group of registers located in a concentrator.
Figure 7:
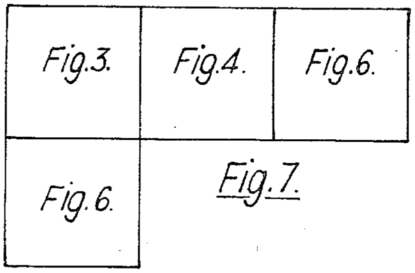
FIG. 7 shows how FIGS. 3–6 should be assembled to provide a complete diagram.

FIG. 6 represents the detailed diagram of the block of registers 360. The circuits include a subscriber's code register 364 and a subscriber's test register 365 mentioned during the study of FIG. 2.

The code register 364 comprises eight flip-flops which are indicated by the numerals 1 to 8, written in the rectangle which symbolizes the register. Each input and output conductor is shown separately. The input conductors are connected to the left hand side of the register, and the output conductors to the right hand side.

This register is cleared responsive to the logical condition $D0x1a$ when the AND circuit 366 conducts. This equation shows that this operation is carried out when a signal D0 is present. This is during the basic time slot $1a$ which immediately precedes the possible reception of a message signal occupying the digit time slot $1(tZ)$. The message signal is available in the flip-flop 303 (FIG. 5) in time position $1bc$.

The signals arriving in series form on the conductor **45*a* are applied to the input of the series-parallel converter 361. Each one of the four output conductors 64 is assigned for the transmission of a signal related to one of the digit time slots 1 to 4. This group of conductors 64 is connected to the first input of the multiple AND circuits 362 and 363**.

The AND circuit 362 is energized by a time signal D0 which lasts up to time position $8b(tZ)/T'1$. Thus, when a number is stored between the digit time slots 1 to 4 of a channel time slot, the information can no more be disturbed if it was the channel time slot $tZ$. The cycle of time frame periods T'1 to T'4 are initiated by condition $\overline{B1}$ during a time D0.

Thus, the selector stores the signal D1 during the time interval $8c(tZ)-7b(tZ+1)/T'1$ (Table I).

In circuit 380 (FIG. 3), the marking code was written on the line Z of the subscriber's store matrix 390 for the logic condition $8d1axD1$. Afterward, the selector stores the time D2 and the marking signal M0 is obtained by decoding the marking code in $tZ/T'2$. This M0 signal lasts from $1a(tZ)$ to $6d(tZ)$ so that it is present during the time interval $1bc-4bc$ when the second half of the subscriber's code must be received. The condition $D2xM0$ energizes the multiple AND circuit 363 so that the message signals received during this time interval $1bc-4bc$ may be stored in the flip-flops 5 to 8 of the register 364.

The subscriber code number is checked, as it is received, by the code checking circuit 330 (FIG. 4). If the condition $\overline{B1}$ is present, the time signal D3 appears. If the condition B1 is present, the circuit 320 shifts the signal back to D0. Then, the cycle T'1 to T14 is interrupted. At the same time, the marking code is cancelled in the selection register 385 (FIG. 3) by a clearing signal which appears responsive to the logical condition $M1x8d1axD2xB1$. That is, in time position $8d1a(tZ)/T'2$ and, in $2(tZ+1)/T'2$, a zero code is written on the line Z of the subscriber store matrix 390 (FIG. 3). These two operations of shifting to D3 or to D0 take place respectively in time position $8c(tZ)/T'2$ and in time position $1c(tZ+2)/T'2$. But, eight digits are written in the register 364 from the digit time slot $4(tZ)/T'2$ on.

The subscriber code register 364 transmits the stored digits, over conductors 46, to the left hand (as viewed in FIG. 6) input of the comparator 371. On its right hand input 48, the comparator receives the code stored in the selection register 385 (FIG. 3). During the time interval $6c(tn)-5c(tn+1)$ the comparator 371 delivers an identity signal G1 on its output conductor 65, if such an identity exists.

At each one of the channel time slots $tn$ ($tn$ may take all the values from $t1$ to $t24$, with the exception of that of the channel time slot $tZ$) this code is either the code of a subscriber who is connected with an outside subscriber, or a zero code indicating that the corresponding channel on the concentrator trunk is free.

If the comparison indicates an identity AND circuit 372 conducts upon occurrence of the logical condition $D3x4xG1$. This is during the digit time slot 4 of each one of the $(m-1)$ channel time slots included in the time interval $(tZ+1)/T'2-(tZ-1)/T'3$ (Table I). The code applied on the comparator input 48 during each one of these channel time slots cannot be a marking code. Therefore, if the comparator delivers a signal G1, it means that the subscriber whose code is written in the register 364 is busy. Since the AND circuit 372 is activated, the channel time slot code present on the group of conductors 60C is transferred into the subscriber's test register 365. Thus, the code of the channel of the busy subscriber is stored in register 365. If no signal G1 appears during the comparison interval, the zero code remains stored in the register 365. This zero code indicates that the subscriber is free. Thereupon, a signal Z1 appears on the output 66 of the zero code decoder 369 associated to the register 365. In short, at the beginning of the time period $(tZ)/T'3$, the register 365 contains either the code of the channel on which the busy subscriber talks, or the zero code if said subscriber is free.

Next, the concentrator clears the marking code on the line Z of the subscriber store matrix 390 (FIG. 3). Then the code is replaced, either by the subscriber's code if he is free, or by the zero code if he is busy. These operations are carried out at the time D5.

The clearing of the marking code is controlled by a clearing signal applied to the register 385 (FIG. 3) and indicated by the logical condition $6d7axD5xM1$ (logical circuits 392 and 395, FIG. 4), i.e. in time period $6d7a(tZ)/T'4$. Starting from this time, a zero code is stored in the register 385. When the subscriber is free, the decoder 369 (FIG. 5) delivers a signal Z1. The code of the subscriber, then stored in the register 364 (FIG. 5), is transferred to the selection register 385 (FIG. 3). This transfer occurs when the multiple AND circuit 357 (FIG. 6) is energized for the logical condition $D5x7bcxM1xZ1$. Referring to Table I, it is seen that this operation is carried out in time position $7bc(tZ)/T'4$. The code of the free subscriber is thus stored on the line Z of the subscriber store matrix 390 in time position $2(tZ+1)/T'4$. During the following time frame period, its line is connected to the call detector in order that this latter controls a line test (on-hook or off-hook).

When the various tests are carried out, the call detector sends, under the control of the sixth phase signal of the cycle, a cut-off code constituted of digits 1. When a number is received during the digit time slots 1 to 8 of a channel time slot $tm''$ of the concentrator, the flip-flop 333 (FIG. 4) is in the condition $\overline{B2}$ in $8d(tm'')-1a(tm''+1)$ and one has $tm''=tZ$ since the local clock of the concentrator is perfectly synchronized with the received signals.

When a marking code is still stored on the line Z of the subscriber's store, the clearing signal of the register 385 is sent responsive to the logical condition $8d1ax\overline{B2}$. Thus, a zero code is stored on the line Z of the matrix 390.

The subscriber's code is returned to the call detector for checking and that code is then stored in the subscriber's test register 365. This code is sent twice successively after complementation. This enables checking. The signals constituting these codes are sent in series form on the outgoing line 43b of the concentrator after regeneration in the flip-flop 370. This flip-flop is reset to zero at the basic time slot *b*. A signal may be stored in this flip-flop during the basic time slot *c* (AND circuit 377 conducts) and transmits at the following basic time slots *d* and *a* when AND circuit 378 conducts.

The transmission of signals to the flip-flop 370 can be carried out only during the presence of the signal M2 which lasts (see Table I) from $6b(tZ+1)$ to $5c(tZ+2)$. This is during each one of the frame periods T'1 to T'4, i.e. during the times D1 to D5. By comparing the graphs 6.6 and 6.11 (FIG. 8), it is seen that this signal M2 coincides exactly with the time interval occupied by a message delivered by the coder.

The transfer of codes to the code detector is carried out as follows:

[1] in $D1x6$ i.e. in $6(tZ+1)/T'1$, the digit of rank 1 of the subscriber's code (AND circuit 379) is sent.

[2] in $D2x(7+8+1)$ i.e. in $7\text{–}8(tZ+1)/T'1$ and $1(tZ+2)/T'1$ the digits of rank 2, 3, 4 of the subscriber's code (parallel-series converter 367) are sent. These two operations are carried out during the frame period T'1.

[3] in $D3x(6+7+8+1)$ i.e. in $6\text{–}8(tZ+1)/T'2$ and $1(tZ+2)/T'2$ the digits of rank 5 to 8 of the subscriber's code (parallel-series converter 368) are sent. This operation is carried out during the frame period T'2.

[4] During the digit time slots 6, 7, 8, 1, 2 of D4, and after D5, the digits stored in the register 365 (parallel-series converter 374, inverter 219, AND circuit 277) are sent. These operations are carried out respectively in T'3 and in T'4.

The converters 367 and 368 and the AND circuit 277 are blocked during the three digit time slots which follow those during which they have been activated so that these three digits are 0, whereas in the reverse direction, these digits were 1.

*FIGS. 10–14*

Figure 14:
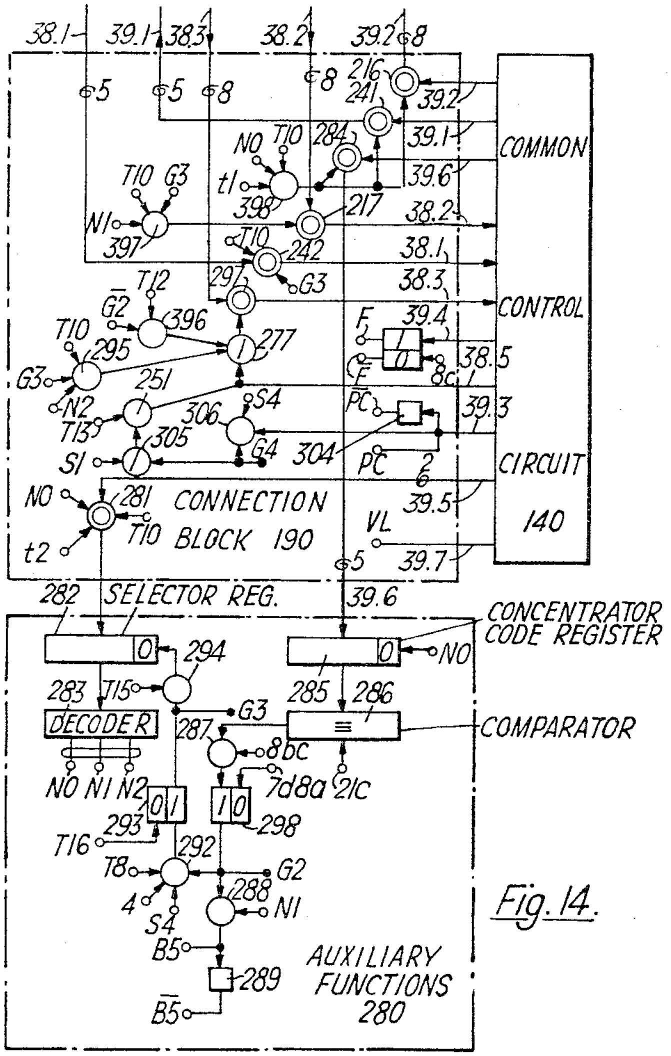
FIG. 14 is a logic diagram of the connection block and of the auxiliary function block located in a call detector.
Figure 15:
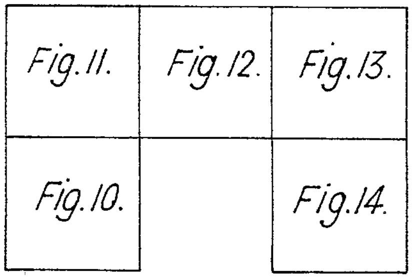
FIG. 15 shows how to assemble FIGS. 11–14.

These drawings show:

The connection block 190, which connects the other circuits of the call detector to the common control circuit (FIG. 14).

Figure 11:
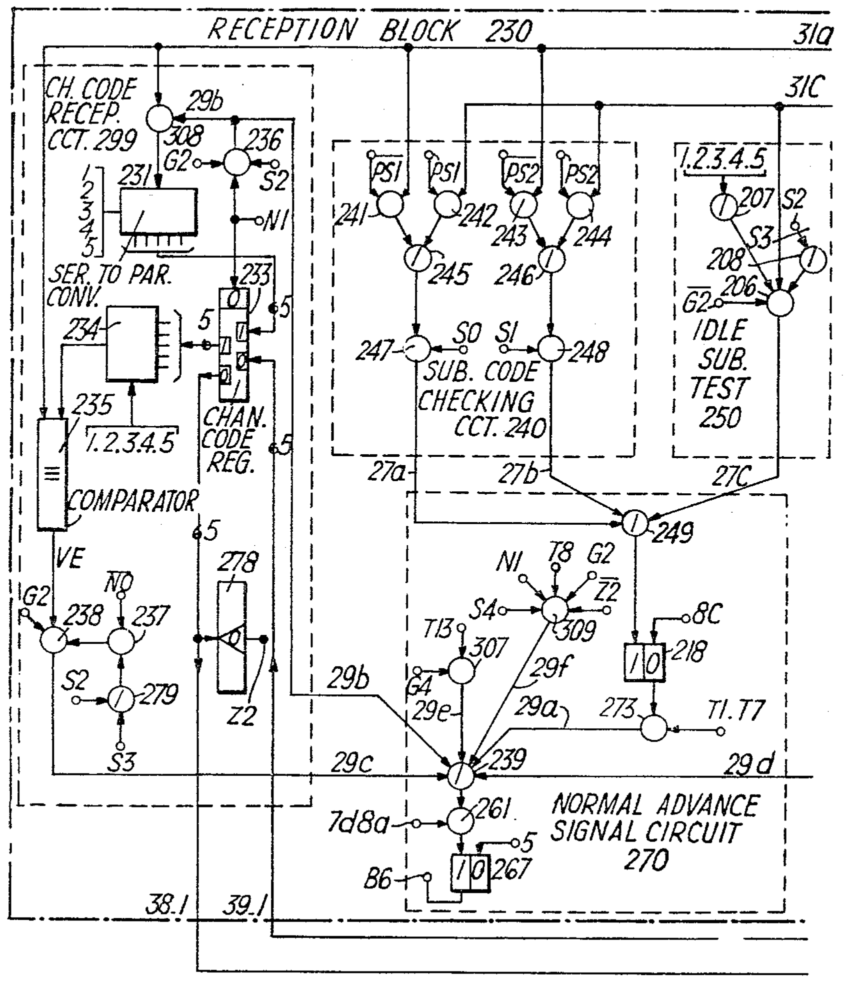
FIGS. 11 and 12 are a logic diagram of a part of the transmission block and of the reception block located in the call detector.

The block of auxiliary functions 280 (FIG. 14),

The operation store 260 (FIG. 10),

The transmission unit 210 (FIGS. 12–13),

The reception block 230 (FIG. 11).

The call detection has two distinct functions:

The transmission of information to the line concentrators.

The reception and the treatment of information coming from the line concentrators and from the common control circuit.

As for this last function, the codes stored on the different lines of the operation store circuit (FIG. 10) were modified in accordance with the results of the test performed in the concentrators, in the call detector, or in other circuits located in the common control circuit. These code modifications are carried out under the control of advance signals produced in the blocks 230 (FIGS. 11, 12) and 260 (FIG. 10) according to a program which will be studied later.

The operations related to a cycle were carried out under the control of signals T1 to T16 which define a time interval of sixteen frame periods. These signals are supplied by the clock 150 (FIG. 2) over the group of conductors 22.

FIG. 14 represents the connection unit 190 placed between the common control circuit 140 (FIGS. 2 and 14) and the blocks 210, 230, 260, 280 of the call detector. This FIG. 14 unit comprises circuits for receiving the signals PC, F and VL transmitted by the common control circuit 140. These signals are used during the fourth and fifth phase signals. FIG. 14 also shows a certain number of coincidence circuits which control, in both directions of transmission, the information transfers between the call detector 200 and the common control circuit 140.

Table II sets forth how signals are transferred between the lines which are assigned to the various registers. The columns (1) to (3) of Table II tabulate the data used during the operation. The column (4) indicates the register in which the result of an auxiliary function is stored. The columns (5) to (7) list the information sent to the common control circuit 140 at the end of operation. The columns (1) and (5) contain the references to the orders N0, N1 or N2 for which a transfer is carried out. The columns (2) and (6) contain the references to the multiple AND circuits interposed on the groups of conductors 39 and 38 connecting the common control circuit to the call detector. Last, the columns (3) and (7) contain the logical conditions for which the AND circuits are energized.

The AND multiple circuits 216, 241, 284, 281 (upper portion of FIG. 14) control the transfer of information from the common control circuit 140 to the call detector 200. The first three AND circuits conduct during the logical condition $T10xN0xt1$ under the control of the AND circuit 398. The AND gate 281 conducts during the logical condition $T10xN0xt2$. The multiple AND circuits 217, 242 and 297 control the transfer in the reverse direction.

TABLE II

| Code Generator or Register | Data | | | | Return of the Information | | |
|---|---|---|---|---|---|---|---|
| | (1) | (2) | (3) | (4) | (5) | (6) | (7) |
| Cyclic Generator of subscriber's codes 221. | N0 | | | N2 | N0<br>N2 | 297<br>297 | {T13xS1<br>T13xS4xPC<br>T12xG2}<br>T10xG3xN2 |
| Subscriber's codes Register 211. | N1 | 216 | T10xN0xt1 | | N1 | 217 | T10xG3xN1 |
| Concentrator code Register 285. | N1<br>N2 | } 284 | { T10xN0xt1<br>T10xN0xt1 | | N0<br>N1<br>N2 | | Channel time slot code sent by the clock to the common control circuit. |
| Channel code Register 233. | N2 | 241 | T10xN0xt1 | N1 | N1<br>N2 | } 242 | T10xG3 |
| Order register 282. | N1<br>N2 | 281 | T10xN0xt2 | | | | |

FIG. 14 also shows details of the blocks of auxiliary functions 280. This block carries out the following functions:

(1) Set up a signal N1 or N2 when an auxiliary function must be carried out and in the other cases, setting up a signal N0. For this, the orders N1 or N2 are received from the common control circuit 140 over conductors 39–5 and are interpreted by the selector register 282 and the decoder 283.

(2) Store the concentrator code in the register 285. This code is received from the common control circuit 140 and used for performing one of the auxiliary functions. From this code, a channel time slot signal G2 is provided, such code corresponding to the concentrator considered. The concentrator code is received from the common control circuit 140 over conductors 39–6.

(3) Provide the signals B5 or $\overline{B5}$ for controlling the transfer of the subscriber's code to the concentrator considered, respectively for an order N1 and for an order N0 or N2.

(4) Provide a signal G3 characterizing the end of an auxiliary operation and controlling the storage of an order N0 in the decoder 283.

If initially an order N0 is stored, the register 285 is cleared. If an auxiliary operation must be performed, the code N1 or N2 is received over conductors 39–5 during a time period T10, of a cycle of phase signals which will be referenced SP(1). Responsive thereto, AND circuit 281 conducts. Next, the concentrator code is received over conductors 39–6 and AND circuit 284 conducts. It will be noted that, for an order N1, the code of the called subscribed is also transmitted over the group of conductors 39–2 to the transmission unit 210. The concentrator code stored in the register 286 of block 280 (FIG. 14) is applied on a first input of a comparator 286. On its second input comparator 286 receives the shifted channel time slot codes delivered by the exchange clock 150 (FIG. 2) over conductors 21C. Thus, a signal appears on the output of this comparator each time that the code $t'$Y is equal to the code Y stored in the register. This comparator output signal is stored in the flip-flop 298 in $8bc(tY-1)$ by the activation of the AND circuit 287. Since this flop-flop 298 is reset in time $7d8a$, a marking signal G2 is available on the output of the flip-flop during each time interval $8c(tY-1)-8a(tY)$ of the storage duration of an order N1 or N2. This G2 signal occurs during the cycle SP(2) following the cycle SP(1) of storage of the data.

A signal B5 is generated for the condition $N1xG2$ (AND circuit 288) and a signal $\overline{B5}$ for the reverse condition (inverter 289). These signals are used in the transmission unit 210 (FIG. 13) which will be studied further on.

Figure 10:
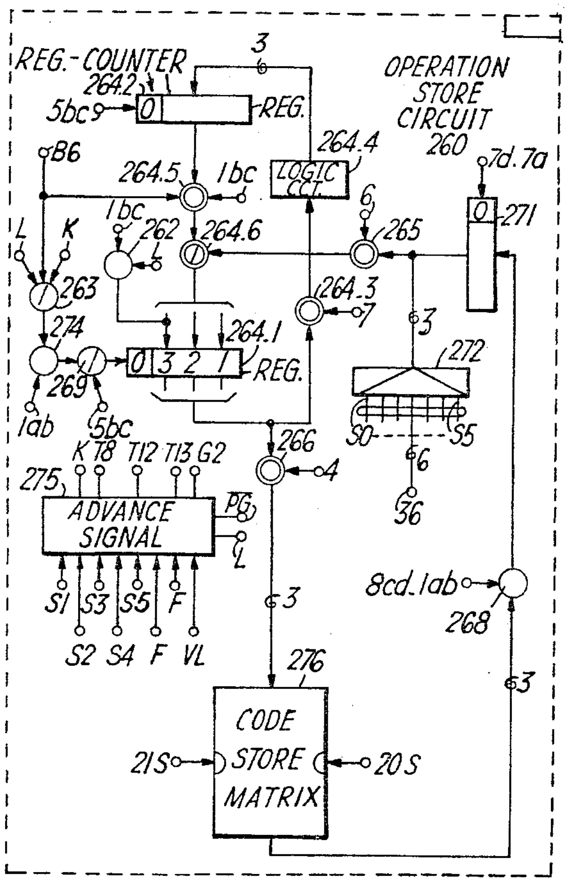
FIG. 10 is a logic diagram of the operation store circuit located in the call detector.

An auxiliary operation is completed if, in time position T8, the code S4 is read on the line Y of the operation store circuit (FIG. 10). When the condition $G2xS4xT8x4$ is established, the AND circuit 292 (FIG. 14) is activated and the flip-flop 293 sets to the 1 state characterizing the condition G3 of end of operation which lasts up to the frame period T16 of the cycle SP(2). Last, the AND circuit 294 delivers, for the condition $G3xT15$, a clearing signal for the register 282. Then the decoder 283 delivers a signal on its output N0 starting from the frame period T15 of the cycle SP(2).

The identification information is sent to the common control circuit 140 in time frame T10 of the cycle following SP(3), transmission being by the activation of the multiple AND circuits 217, 242 and 297.

To avoid the simultaneous transfer of information in two directions during the same frame period T10 (Table II), the transfers from the common control circuit 140 to the call detector 200 are conditioned by the presence of an order N0. The transfers in the opposite direction are conditioned by the presence of an order N2 or N1. There is an exception controlled by the activation by the multiple AND circuit 242.

If an auxiliary operation is completed, for instance during the cycle of phase signals SP(2), the information is transferred, in time frame T10 of this cycle, from the call detector 200 to the common control circuit 140. In time T15, the decoder 283 delivers a signal N0. Thus it is only in time T10 of the next cycle of phase signals SP(3) that information can be transmitted from the common control circuit 140 to the call detector, if a new auxiliary operation must be carried out.

The AND circuit 284 (circuit 190, FIG. 14) which enables the transmission of the concentrator code to the unit 280, is activated for the logical condition $T10xt1xN0$ (Table II). To be certain that the signal N0 is present during this operation, the code of the order N1 or N2 is transmitted by the activation of the multiple AND circuit 281 at the time position $t2$ for the logical condition $T10xt2xN0$. In the same way, the AND circuits 216 (transmission of the subscriber's code for the execution of an order N1) and 241 (transmission of the channel code for the execution of an order N2) are activated for the condition $T10xt1xN0$.

FIG. 10 represents the detailed diagram of the operation store circuit 260. A given line R out of the $m-1$ lines of this store is assigned to the concentrator number R. A code is stored on line R giving a value which characterizes the state of progress of the operation being performed. This code can be modified or not during each frame period of a cycle of phase signals. These operation codes are read in a cyclic way, the line R being activated by the appearance of a shifted channel time slot signal $t'$R on conductors 21S. The reading occurs when the multiple AND circuit 268 conducts in time period $8cs(tR-1)-1ab(tR)$. This AND circuit controls the transfer of the code stored in the register 271. Th different codes which comprise three digits may take one of the decimal values 0 to 5. These codes are decoded by the six output decoder 272 associated with the register 271. The register 271 is cleared in time position $7d-8a$. The selection time interval of one of the outputs of the decoder 272 is thus $8d(tR-1)-7c(tR)$, if it is assumed that it takes at most one digit time slot to change the state of each flip-flop of the register 271.

The modifications of the operation codes are achieved by the two-register counter 264 which comprises the elements referenced 264-1 to 264-6. These modifications may be:

(1) Either the re-writing on the line R of the same code as that which had been extracted therefrom, (2) Or the storage on the line R of the code immediately higher than the code extracted (for instance code S4 instead of code S3), (3) Or the store on the line R of either the code S0 or the code S1.

The code modification operations are controlled by the presence or the absence of signals referenced B6, K, L. Thus:

The first type of modification is controlled by the simultaneous absence of these three signals.

The second type of modification is controlled by the presence of a signal B6.

In the third type of modification, the passage in S0 or in S1 is controlled by the presence respectively of a signal K or L. The signal B6 is delivered by a flip-flop 267 (FIG. 11) during a time interval $8a(tR)-4d(tR+1)$. The signals K and L are delivered by the logical unit 275, the details of which are shown on FIG. 16.

The counter 264 (FIG. 10) comprises the registers 264-1, 264-2; the multiple AND circuits 264-3, 264-5, the multiple OR circuit 264-6 and the logical circuit 264-4. When circuit 264-4 receives one of the codes S0 to S4 on its three inlets, it delivers on its three output terminals the code immediately higher, such as S1 to S5, respectively. The code stored in the register 271 is re-written in the register 264-1, by the activation, in digit time slot 6, of the multiple AND circuit 265. At the digit time slot 7, this code is applied to the logical unit 264-4 via multiple AND circuit 264-3. This logic unit then delivers the code immediately higher to the register 264-2. If the code stored in the register 271 was, for instance, the code S3, at the time $7(tR)$ the register 264-1 contains the code S3 and the register 264-2 contains the code S4.

The three flip-flops of the register 264-1 are shown symbolically by the numerals 1, 2, 3, the numeral "1" characterizing the flip-flop of the most significant rank. On the other hand, the clearing of this register 264-1, i.e. the storage of the code S0, is carried out by the OR circuits 263 and 269 and by the AND circuit 274 for the logical condition.

$$(B6+K+L)x1ab+5bc \qquad (2)$$

The register 264-2 is cleared in time $5bc$.

Last, the new code is written in the matrix 276 responsive to the activation of the multiple AND circuit 266 in $4(tR+1)$. This new code is written in the line R of the matrix which line is selected by the normal channel time slot signals applied to the matrix over the conductors 208.

The Equation 2 shows that the register 264-1 stores the code S0 in $5bc$ just after the writing on the line R of the matrix 276. It shows also that, in $1ab(tR+1)$, the code S0 is stored in this register for the condition $(B6+K+L)$. When the signals B6, K and L are absent simultaneously, the code S3 is stored in the register 264-1 in $6(tR)$ by the activation of the multiple AND circuit 265. Thereafter this code can not be further modified, except for its transfer to the matrix 276 in $4(tR+1)$.

When the signal B6 is present, the code S0 is transferred, in $1ab(tR+1)$, in the register 264-1 according to the Equation 2. The multiple AND circuit 264-5 is activated in $1bc$ for the condition $B6x1bc$ and the code S4 stored in the register 264-2 is re-written in the register 264-1, then transferred in $4(tR+1)$ on the line R of the matrix 270. When the signal K is present, the code S0 is stored in $1ab(tR+1)$ in the register 264-1 and can not be modified up to its transfer to the matrix 276. When a signal L is present, the AND circuit 262 delivers a signal in $1bc(tR+1)$ which is applied at the 1 input of the flip-flop of rank 3 of the register 264-1 so that the code S0, which was stored in $1ab$, is modified into a code S1. It is assumed, in this description, that a binary code is used in which the codes S0 and S1 are represented respectively by the numbers 000 and 001.

Only one of the three signals B6, K, L may be present at a given instant but all three of these signals may be absent simultaneously.

Figure 12:
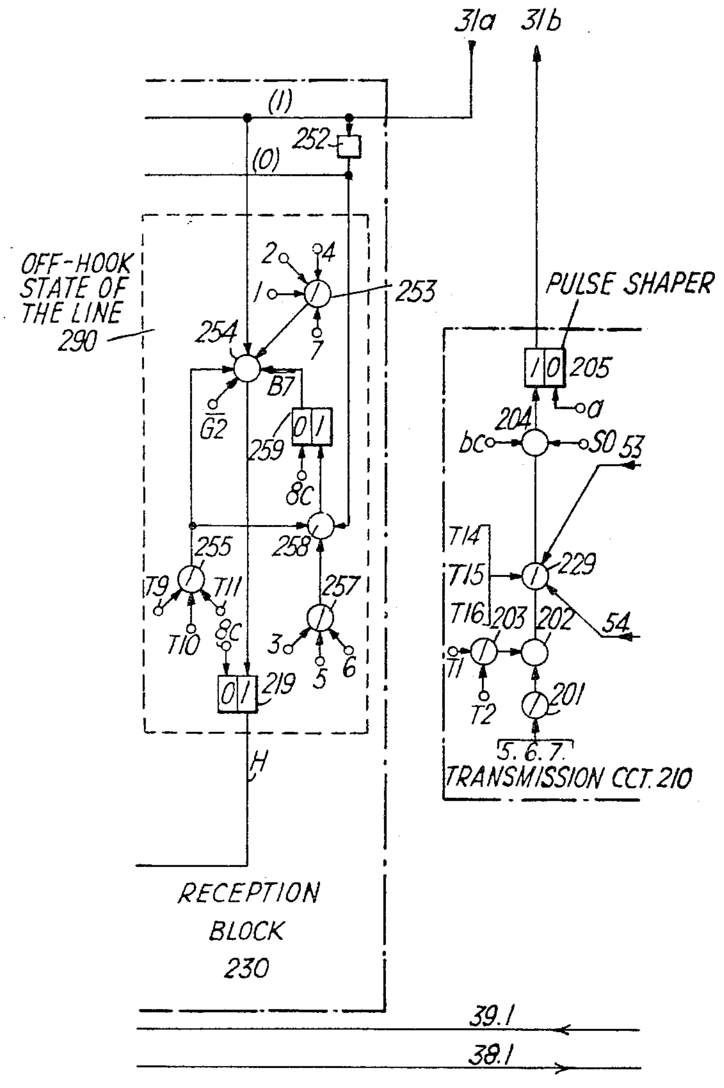
Figure 13:
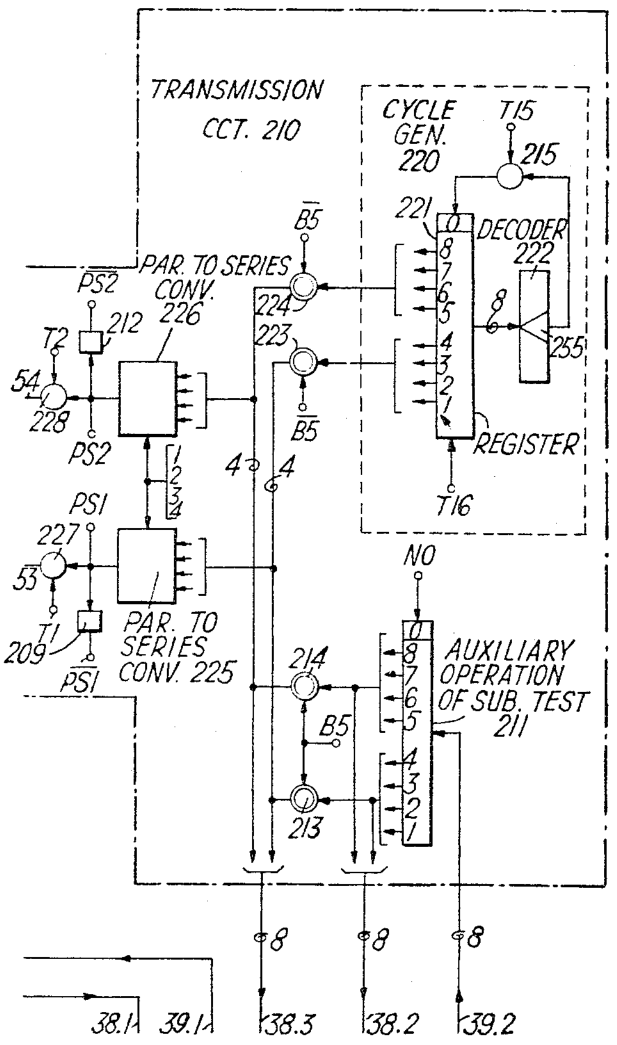
FIG. 13 is a logic diagram of a part of the transmission block located in the call detector.

FIGS. 12, 13 show a transmission unit designed for producing and transmitting codes on the outgoing line 31b (FIG. 12) during the first phase signal (transmission of subscriber's code) and the sixth phase signal (transmission of a cut-off code) of a cycle of phase signals.

The signals used are:

The signals T1, T2, T14, T15 and T16, defining these phase signals, are delivered by the clock 150 (FIG. 2) over conductors 22.

The signals B5 and $\overline{B5}$ are delivered by the unit 280 (FIG. 14).

The signal T10 is delivered by the clock 150 for the storage of a subscriber's code in a register 211 (FIG. 13) assigned to the auxiliary operation of called subscriber's test.

The signal T16 is delivered by the clock 150 and controls the advance of the cyclic generator of subscriber's code 220.

The signal N0 delivered by the decoder 283 (FIG. 14).

The signal S0 characterizing a channel time slot during which a zero code has been read into the operation store.

The subscriber's codes used for the performance of the orders N0 and N2 are provided by the cyclic generator of subscriber's code 220 (FIG. 13) comprising a counter 221 with eight flip-flops referenced 1 to 8. At each signal T16, the counter advances by one position. When its stores the code corresponding to the decimal number 255 ($2^8-1$), the decoder 222 associated with it delivers a signal in T15 via AND circuit 215. This signal clears register 221 so that the subscriber's code 1 is stored in the counter during T16 of the same phase signals cycle. Thus, it is seen that the zero code does not constitute a subscriber's code.

When the condition $\overline{B5}$ is present, i.e. for each concentrator on which either an order N0 or N2 is carried out, the digits of rank 1 to 4 are transmitted to the series-parallel converter 225 via AND circuit 223. The digits of rank 5 to 8 are transmitted to the converter 226 via AND circuit 224. Each one of these converters is activated in parallel 1, 2, 3 and 4 and delivers the signals in series form on the outputs PS1 and PS2. Signals $\overline{PS1}$ and $\overline{PS2}$ are obtained through the inverters 209 and 212.

The signals PS1 and PS2 are applied respectively to the AND circuits 227 (activated in T1) and 228 (activated in T2). The frame period T1 is reserved for the transmission of the first part of the subscriber's code and the frame period T2 for the transmission of the second part of the subscriber's code. The output conductors 53 and 54 of the AND circuits 227 and 228 are connected to two of the inputs of an OR circuit 229 (FIG. 12). The signal delivered by OR circuit 229 is stored in a re-shaping flip-flop 205 when the AND circuit 204 is activated for the logical condition $S0xbc$. A third input of the OR circuit 229 receives, in T1 and in T2 (OR circuit 203), signals during the digit time slots 5, 6 and 7 (OR circuit 201, AND circuit 202). These signals constitute the particular characteristic of each half of subscriber's code which will be recognized in each concentrator (circuit 330, FIG. 4).

Since the reshaping flip-flop 205 is reset to 0 at the basic time slot *a*, and a signal is stored therein in time position *bc*, a signal is available on the outgoing line 31*b* of the code detector in time position *cd*. When an auxiliary operation of called subscriber's test (order N1) must be performed, the subscriber's code is received from the common control circuit in T10 (multiple AND circuit 216 [FIG. 14]) of the preceding phase signal cycle, and is stored in the register 211.

The condition B5 was set up during the channel time slot corresponding to the concentrator in which this operation was carried out. Responsive to the signal B5, the code is transmitted to the converters 226 and 225 (FIG. 13) via AND circuits 213 and 214. The remainder of the operation occurs as stated in the description of the generator 220. The register 211 is cleared by an order N0.

Last, OR circuit 229 receives signals in T14, T15 and T16. Thus when a signal S0 is applied to the AND circuit 204, the cut-off code is transmitted three successive times to the corresponding concentrator. That is, a signal is transmitted to the flip-flop 205 at each time *bc* of these frame period.

FIGS. 11, 12 represent the detailed diagram of the reception unit 230 which comprises:

The subscriber's code checking circuit 240.
The circuit 250 checks the idle subscriber test.
The circuit 270 delivers normal advance signals.
The circuit 290 tests the state of the line.
The channel codes reception circuit 299.

The circuits 240, 250 and 270 are used during the second phase signal for checking the information received from the different concentrators. The circuit 290 is used during the third signal for performing a test of line state on the line of each idle subscriber.

The operation of circuits 240 and 250 is not controlled by either an operation order or a phase signal. The signals transmitted on the service channel of each one of the concentrators appear on the incoming line of the call detector 31*a* (FIG. 12). Each of these signals is a digit 1. An inverter 252 marks the conductor 31*c* with a signal digit 0.

The circuit 240 compares the subscriber's code returned over conductors 31*a* and 31*c* from each concentrator with the code that was sent, during the first phase signal, by the transmission unit 210 (FIGS. 12, 13). For this comparison, the signals received on line 31*a* are compared to the series signal PS1, $\overline{PS1}$ (digits of rank 1 to 4 of the subscriber's code) and PS2, $\overline{PS2}$ (digits of rank 5 to 8 of the subscriber's code). These series signals were sent from the series-parallel converters 225 and 226 (FIG. 13).

Since the signals on line 31*a* are perfectly synchronized with the signals PS1 and PS2, a digit time slot 1 of the office clock 150 corresponds to a digit of rank 1 in the message received on the incoming line of the call detector, etc.

A code S0 is initially stored on all the lines of the operation store (FIG. 10), which lines correspond to concentrators in which tests concerning a new calling or called subscriber have to be carried out. If the first part of the received subscriber's code is correct, this code is modified into a code S1. When the second part of the subscriber's code is correctly received, this code is further modified into a code S2.

The circuit 240 (FIG. 11) comprises two separate comparators assigned to check the first and of the second parts of the subscriber's code. A first of these comparators comprises the AND circuits 241 and 242. It is activated when a signal S0 is applied to the AND circuit 247. When, for instance, the digit of rank 1 of the subscriber's code is 1, the converter 225 (FIG. 13) delivers a signal PS1. If, at this same time, a digit 1 is received on the line 31*a*, neither of the AND circuits 241 and 242 is activated. If, on the contrary, a digit 0 (signal on the conductor 31*c*) is received at this time, the AND circuit 242 delivers a signal which activates the AND circuit 247. Thus it is seen that this AND circuit 247 delivers a signal on its output 27*a* when one of the digits received is different from the corresponding digit of the subscriber's code stored in the register 211 or 221.

The AND circuits 243 and 244 constitute the second comparator assigned to check the second part of the subscriber's code. This comparator is activated when a signal S1 is applied to the AND circuit 248 which then delivers a signal on its output 27*b*.

The digits of ranks 5, 6, 7 and 8 of a part of subscriber's code (returned from a concentrator to the call detector) are logically the signal 0. Since the converters 225 and 226 (FIG. 13) deliver 0 during these digit time slots, one of the AND circuits 247 or 248 delivers an error signal if one of the digits received in 5, 6, 7 is a 1.

The idle subscriber test circuit 250 comprises the AND circuit 206. This circuit receives information in the form of a code "one" (code constituted by five digits 1). First, the AND circuit 206 is activated by the condition $\overline{G2}$ which identifies all the concentrators searching to find a new calling subscriber. Second, the conditions S2 of S3 cause the OR circuit 208 to conduct. Third, a signal appears on the conductor 31*c* (digit 0) during the digit time slots 1 to 5 (OR circuit 207). When these three conditions occur the AND circuit 206 conducts. Now, the signal on output conductor 27*c* indicates that the code received is not the code of an idle subscriber.

A signal 27*a*, 27*b* or 27*c* is here called an "error signal." These three error signals are applied to the OR circuit 249 located in the normal advance signals circuit 270 (FIG. 11). In addition, circuit 270 includes the flip-flops 218 reset to zero in 8*c*, and flip-flop 267 reset to zero in 5, OR circuits 239 and 249, and AND circuits 261, 273, 307 and 309. An error signal appearing on one of the inputs 27*a*, 27*b*, 27*c* is applied through OR circuit 249 to the input 1 of the flip-flop 218. The output 0 of this flip-flop is connected through the AND circuit 273 to the conductor 29*a*, OR circuit 239, and AND circuit 261 to the input 1 of the flip-flop 267. If the flip-flop 218 is in the 0 state during the time interval $7d8a$ of the frame periods T1 to T7, flip-flop 267 delivers a signal B6. The counter 264 (FIG. 10) responds by a normal advance. The flip-flop 218 is set to the 1 state when an error is detected by the circuits 240 and 250 (FIG. 11). Thus, if flip-flop 218 is in the 0 state during the time interval $8a(tR)-4d(tR+1)$, it means that the information received is correct and that the code immediately higher may be stored in the line of the operation store assigned to the concentrator R. The flip-flop 267 may also deliver a normal advance signal B6 when it receives a signal over conductor 29*d*. The flip-flop 267 may also be set to its 1 state (condition B6) by either a signal 29*b* or a signal 29*c* coming from the circuit 299, or by a signal 29*e* or 29*f*, delivered by one of the AND circuits 307 or 309.

The off-hook state of the line circuit 290 (FIG. 12) operates when the voltage $Vd>Va$ appears as the subscriber's set is lifted. This off-hook test is carried out during three successive time frame periods T9, T10 and T11.

It will be assumed that any code higher than 22 characterizes a lifted or off-hook set. Since the 7-digit, speech codes are expressed in natural binary code, such a code will contain a message signal:

either in the ranks 1 or 2,
or in the ranks 3 and 4,
or in the ranks 3, 5, 6 and 7.

At the end of the test channel time slot *t*R, the circuit 290 delivers a signal H on its outlet 29*d* if one of these conditions is fulfilled, i.e. when $Vd > Va$. Circuit 290 comprises the flip-flops 219, 259 reset to the 0 state in 8*c*, the AND circuits 254 and 258, and the OR circuits 253, 255, 257. The first input of the AND circuits 254 and 258 is energized during the frame periods T9, T10, T11. The second input of the AND circuit 254 is connected to the line 31*a* (information 1) and that of the AND circuit 258 is connected to the line 31*c* (information 0).

In 8*c* of the channel time slot ($tR-1$), the two flip-flops 259 and 219 are thus in the 0 state. When a digit 1 is received during the digit time slots 1 or 2 of the channel time slot *t*R, the OR circuit 253 delivers a signal which activates the third input of the AND circuit 254. The fourth input is activated by a signal B7 indicating that the flip-flop 259 is in the 0 state. The fifth input is activated by a signal $\overline{G2}$ indicating that an order N0 is carried out. The AND circuit 254 is then activated. The flip-flop 259 sets to the 1 state and indicates the condition $Vd > Va$. Regardless of the digits thereafter received, flip-flop 259 remains in this state up to 8*c*.

When a digit 1 is received during the digit time slot 3, neither of the AND circuits 254 and 258 is activated. However, if a digit 0 is received during the digit time slot 3, a signal 31*c* activates the second input of the AND circuit 258, a signal delivered by the OR circuit 257 energizes its third input so that the flip-flop 259 sets to the 1 state, i.e. to the condition B7.

Thereafter, the fourth input of the AND circuit 254 can not be activated during the remainder of this channel time slot. Thus, a signal B7 is present, at the end of the digit time slot 3, only if the digit of rank 3 is a 1. When a digit 1 is received during the digit time slot 4 and if a signal $\overline{B7}$ is present, the flip-flop 219 sets to the 1 state. If a digit 0 is received during the digit time slot 4, the AND circuits 254 and 258 do not conduct.

The circuits operate durming a digit time slot 5, as well as during a digit time slot 3 and a signal $\overline{B7}$ can be present at the end of this digit time slot 5 only if the digits of rank 3 and 5 were 1. In the same way, if the digit of rank 6 is a 1, a signal B7 is present at the end of the digit time slot 6. Last, if the digit of rank 7 is a 1, the AND circuit 254 is activated and the flip-flop 219 sets to the 1 state. Since the AND circuit 254 is activated in *bc*, the flip-flop 219 is in the 1 state, if $Vd > Va$ at least during the time interval 7*d*–8*c*.

The signal H appears on the output 1 of flip-flop 219 (conductor 29*d*) and is applied through the OR circuit 239, in 7*d*8*a*, to the flip-flop 267 which sets to the 1 state—establishing the condition B6 for normal advance.

The channel codes circuit 299 (FIG. 11) is used to perform an auxiliary function controlled by an order N1 or N2. The channel code register 233 is a principal part of circuit 299. On the right-hand side of this register, the digits 1 and 0 symbolize the inputs 1 and 0 of the flip-flops constituting register 233. In the same way, the digits 1 and 0 located on the left-hand side symbolize the outputs 1 and 0 of the same flip-flops. Thus, the channel codes received from the common control circuit 140 (FIG. 14) are applied to the inputs 0. The codes received from the concentrators on the input 31*a* are applied to the inputs 1. But, the codes stored in the subscriber's test register 365 (FIG. 6) were complemented before transmission to the call detector. To compare these codes in the call detector with those received from the circuit 140, one of them must be complemented. Here the codes received from the circuit 140 are complemented by the two inputs of the registers 233 (FIG. 11). The same thing happens during the reading of the register. The code which must be transmitted to the circuit 140 is taken on the outputs 0 of the flip-flops.

During a cycle of phase signals, only one auxiliary function may be performed by the circuit 280 (FIG. 14) on only one concentrator Y. That concentrator is identified by the signal G2 which appears during the time interval $8c(tY-8a(tY)$. In circuit 299 (FIG. 11), a channel code stored in the register 233 is compared with the codes received on the incoming line 31*a*. This operation is performed in the comparator 235 and the identity signal V*e* transmitted on the conductor 29*c* by the activation of the AND circuit 238, and applied to the OR circuit 239. The signals 31*a* are applied, through the AND circuit 308, to the series-parallel converter 231 for the five AND circuits corresponding to the five digits of a channel code are successively activated by the digit time slot signals 1 to 5. The five output conductors of this converter are connected to the inputs of the register 233 so that the code received on the line 31*a* is written in the register when the AND circuit 308 is activated.

The complemented of a channel code coming from the common control circuit 140 (FIG. 14) over the group of conductors 39–1 may also be stored in the register by the activation of the AND circuit 241 (FIG. 14).

The code stored in the register 233 is converted in series form by the converter 234. The output conductor of register 233 is applied to the first input of the series comparator 235. This latter receives on its second input the signals 31*a* and delivers the identity signal V*e*

When an order N1 must be carried out, the AND circuit 236 becomes conductive for the logical condition $G2xS2xN1$. Its output signal 29*b* activates the AND circuit 308 so that the code received during the digit time slots 1 to 5 of the channel time slot *t*Y is written in the register 233. At the same time, the signal 29*b* is also applied to the OR circuit 239 located in the circuit 270 so that, normal advance signal is provided, the code S3 is stored on the line Y of the operation store circuit 260.

At the next frame period, the signal G2 appears once again in *t*Y. The code received on the line 31*a* is compared to the code stored in the register 233. If the two codies are identical, the identity signal is applied to the AND circuit 238 which is activated for the condition $G2x\overline{N0}xS3$ (AND circuit 237, OR circuit 279). Then, the output signal 29*c* controls the writing of the code S4 on the line Y of the operation store.

When an order N2 must be carried out, the register 233 contains the complement of a channel code which is compared to the codes received on the line 31*a*. If the two codes are identical, the identity signal is applied to the AND circuit 238 which is activated for the condition $G2x\overline{N0}xS2$. The code S3 is written on the line Y of the operation store.

At the next frame period, the identity signal is applied to the AND circuit 238 which is activated for the condition $G2x\overline{N0}xS3$ and the code S4 is written on the line Y of the operation store.

Referring to the description of the circuit 280 (FIG. 14) it will be noted that the signals G2 (time position *t*Y) and B5 (transfer signal of the subscriber's code for an order N1) are produced at the frame period T10 of a cycle SP(1), for being effectively used only at the next cycle SP(2). Nevertheless, the information received from the concentrators during this cycle SP(1) in the course of which the order N0 is stored, is used before the frame period T10. It is then ascertained that no information at all is received from T10 to T16 with the exception, eventually, of the code characterizing the level V*d*. Therefore, no wrong signal 29*c* or 29*b* can be delivered by the circuit 299 although it is activated during this time interval.

*Signal modification.*—After having described, in relation with the FIGS. 10–14, the different circuits constituting the call detector, reference is made to the mode of providing modification signals of the operation codes. The characteristics of the three types of modification are:

First type of modification: the code read in the operation store circuit 260 is re-written when the signals B6, L and K are simultaneously absent.

Second type of modification: the code immediately higher than the code read under the control of a normal advance signal B6 is written on the considered line.

Third type of modification: the code S0 or the code S1, under the control respectively, of a signal K or R is stored on the considered line.

Figure 16:
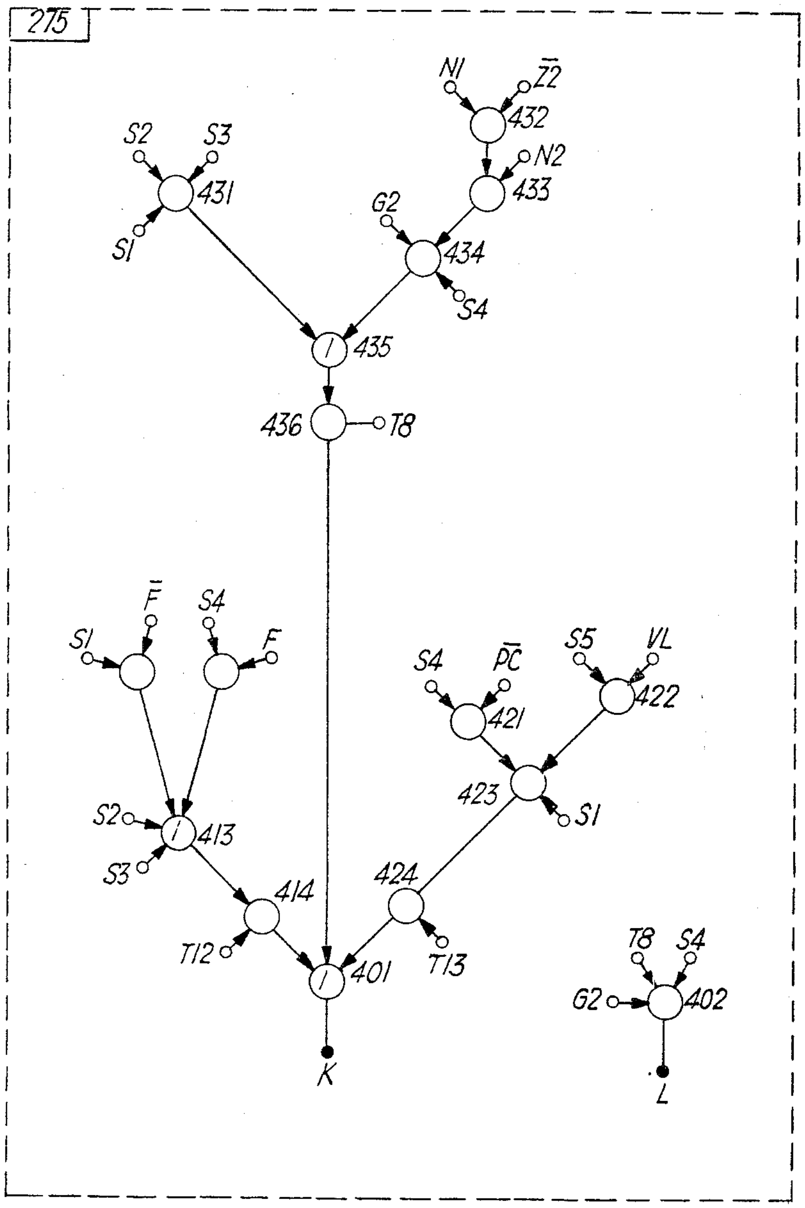
FIG. 16 is a logic diagram of a control block located in the operation store circuit of the call detector.

The normal advance signal B6 is provided in the block 275 of the operation store 260 (FIGS. 10 and 16).

The following references are used:

CA for a logical condition indicating that the digits received during the digit time slots 1 to 4 of a channel time slot are identical to the four digits transmitted during the same digit time slots by one of the series-parallel converters 225 or 226 (FIG. 13).

LB for a logical condition indicating that the digits received during the digit time slots 1 to 5 of a channel time slot, constitute a code of an idle subscriber.

These logical conditions do not appear effectively in the circuits 240 and 250. Also, the flip-flops 218 and 219 are not taken into account in the writing of the logical equations representing the conditions of advance. These conditions having been described previously, the equations constitute but a condensed way of statement of the result obtained.

The program of modifications of codes during the performance of a main operation on a given concentrator referenced X, will be first described.

A code S0 is stored, at the beginning of the considered phase signals cycle, on the line X of the operation store 260. During the second phase signal reserved for the reception of coded information coming from this concentrator:

$S0xCAx(T1-T7)=B6$ and a code S1 is written in the line X of the operation store.

$S1xCAx(T1-T7)=B6$: a code S2 is written in the line X of the operation store.

$S2xLBx(T1-T7)=B6$: a code S3 is written in the line X of the operation store.

$S3xLBx(T1-T7)=B6$: a code S4 is written in the line X of the operation store.

At the end of the second phase signal, i.e. in T8, one of the two following operations are carried out:

$$S4xT8x\overline{G2}=S1$$

(3)

this code characterizing an idle subscriber.

$$(S1+S2+S3)xT8x\overline{G2}=S0$$

(4)

this code characterizing a busy subscriber or a faulty transmission.

The channel time slots corresponding to the performance of main operations are marked responsive to the condition $\overline{G2}$ of the Equation 3. The logical conditions represented by the Equations 3 and 4 are achieved in the logical block 275 (FIG. 10) and produces the first one a signal L and the second one of a signal K.

When a signal B6 has not been delivered by the reception unit 230 during one or several frame periods in the course of which such a signal could have been produced, signals K and L do not appear and the code read is rewritten without modification on the line X of the operation store circuit 260.

The third phase signal, which occupies the frame periods T9, T10, T11 is reserved to the test of line state (on-hook or off-hook). If the subscriber is free, the code S1 is stored on the line X of the operation store and one has:

$S1xHxT9=B6$, a code S2 is written in the line X of the operation store.

$S2xHxT10=B6$, a code S3 is written in the line X of the operation store.

$S3xHxT11=B6$, a code S4 is written in the line X of the operation store.

At the end of the channel time slot $t$X of the frame period T11, a code S4 characterizes thus a free subscriber whose set it off-hook.

The service channel used on the concentrator trunk is not used during normal traffic. Also, the signals H can be delivered by the circuit 290 (FIG. 12) only when the set is lifted before the setting up of a communication. A busy subscriber has, therefore, no influence on the operation of this circuit. On the contrary, if there has been a transmission fault on the code indicating an idle subscriber, the signals H may occur and a code S0 is stored on the line X of the operation store at the beginning of the third phase signal. At the end of this phase signal, one of the codes S1, S2 or S3 may be stored on this line X.

The fourth phase signal which takes place during the frame period T12, is reserved for the test of the FC store located in the common control circuit 140 (FIG. 14). This store is of the matrix type in which a storage cell is assigned to each subscriber. Information F is stored therein if the subscriber has transmitted a faulty call. For each channel time slot of the frame period T12 (except that eventually reserve to the performance of an auxiliary function), the selection of a cell is carried out according to the subscriber's code stored in the cyclic generator 221 of the call detector and to the shifted channel time slot code applied directly to the store. The subscriber's code is transmitted to the common control circuit 140 by the activation of the multiple AND circuit 297 of the block 190 (FIG. 14) for the condition $T12x\overline{G2}$. The term G2 indicates all the channel time slots at which main operations are performed (logical circuits 396 and 277, FIG. 14).

It will be assumed that the reading of the cell is carried out in time position $7d8a(tX-1)$. At the beginning of the channel time slot $t$X, the information transmitted on the conductor 39–4 is stored in the flip-flop 296 of the block 190 which receives a resetting signal at the time $8c$. The operations carried out have been described in detail in relation with the FIG. 2 and may be summed up as follows:

$$(S1x\overline{F}+S4xF+S2+S3)xT12=S0 \qquad (5)$$

The codes S2 and S3 given in this equation could have been obtained during the test of state of line if there was a fault, either on the transmission of the idle subscriber code or in the generation of a signal H.

At the end of this phase signal, a code S4 means thus a new calling subscriber and a code S1, an on-hook idle subscriber station which has transmitted previously a faulty call. The logical condition represented by the Equation 5 is achieved in the block 275 (FIG. 16) and enables the generation of a signal K.

The fifth phase signal, which takes place during the frame period T13, is reserved to the exchange of information within the office from the call detector to the common control circuit and in the opposite direction. These operations are controlled by the logical circuits located in the connection block 190, FIG. 14.

The first operation consists in controlling the erasing of the information F in the FC store when a code S1 is written on the considered line of the operation store 260. This is carried out by selecting the cell by the logical condition $S1xT13$ set up by the circuits 305, 251, 277 and 297 (FIG. 14) and by transmitting an erasure signal on the conductor 38–5 (FIG. 14). The code S1 is also modified into a code S0:

$$S1xT13=S0 \qquad (6)$$

The second operation consists in the taking over, by the common control circuit, of the one or several new calling subscribers characterized by the presence of a code S4 on the one or several lines which are assigned to their concentrators in the operation store circuit 260. This taking over can be carried out only if the common control circuit transmits, during the corresponding channel time slot, a signal PC on the conductor 39–3: $G4=S4xPC$ (AND circuit 306, FIG. 14).

Thus, when a signal G4 is present at a channel time slot at which a code S4 is read in the operation store, the subscriber's code stored in the cyclic generator 220 (FIG. 13) is transferred to the common control circuit by the activation of the multiple AND circuit 297 (FIG. 14) for the logical condition $G4xT13$ (logical circuits 305, 251, 277, FIG. 14). Now $G4xT13=B6$ and the code S5 is written in the line X of the operation store 260.

When a signal $\overline{PC}$ is present i.e. when the common control circuit cannot take over the new calling subscriber one has:

$$S4x\overline{PC}xT13=S0 \quad (7)$$

The storage of the code S5 on the line X of the operation store circuit 260 means that the common control circuit will control the setting up of a connection between the concentrator number X and one of the recorders of the block 100 (FIG. 2), the channel used on the trunk of the concentrator being the service channel Z. Thus, on this concentrator, there is no more service channel available, and a code S5 characterizes therefore this condition.

When the new connection between the concentrator and a recorder is set up, the common control circuit controls the search of a free channel on the trunk of the concentrator X. When a free channel is found, a signal VL is transmitted on the conductor 39–7 to the connection block 190 (FIG. 14) at the time slot $tX$ of the frame period T13 of one of the cycles of the following phase signals and one has:

$$S5xVLxT13=S0 \quad (8)$$

Last, the sixth phase signal which includes the frame periods T14, T15, T16 is assigned to the transmission of the cut-off code, as it has been explained during the description of the transmission unit 210 (FIGS. 12, 13). This code is transmitted to all the concentrators for which a code S0 is stored in the corresponding line of the operation store.

The program of code modifications concerning the performance of a called subscriber's test (order N1) will be described now.

As in the previous case, a code S0 is stored at the beginning of the phase signals cycle considered on the line Y of the operation store circuit 260. The common control circuit transmits, in T10 of the cycle SP(1), the called subscriber's code, the concentrator code, and the order code. It has also been seen that the operation itself was carried out during the next cycle SP(2).

Thus, one has: $S0xCAx(T1–T7)=B6$ controlling the writing of the code S1 on the line Y of the operation store.

$S1xCAx(T1–T7)=B6$ controlling the writing of the code S2 on the line Y of the operation store.

It is seen that these two operations are the same as for a main operation. One has afterwards:

$S2xN1xG2=B6$ controlling the writing of the code S3 on the line Y of the operation store.

$$S3xVExN1xG2=B6 \quad (9.1)$$

controlling the writing of the code S4 on the line Y of the operation store.

At the end of this second phase signal, i.e. in T8, one of the two following operations are carried out:

$$(1)\ G2xS4xZ2xN1xT8=B6$$

and a code S5 is stored on the line Y of the operation store. The signal G2 defines the time position for performing the order N1 and the signal Z2 means that the result of the test is positive, i.e. that the called subscriber is free.

The storage of a code S5 means thus that the called subscriber is free and it has been seen, during the study of the unit 280 (FIG. 14) that a signal G3 was also present during the time interval T8–T16.

$$(2)\ (S1+S2+S3+S4x\overline{Z2})xG2xT8xN1=S0 \quad (10)$$

For the condition $S4x\overline{Z2}$ it will be said that the result of the test is negative.

The operation 10 characterizes either a fault in the transmission or a called subscriber who is busy.

The frame period T10 of the third phase signal is assigned for the transfer, from the call detector to the common control circuit of information concerning the called subscriber's test when a code S4 is stored on the line Y of the operation store, and this whether the result of the test is positive or negative.

This condition is shown out by the signal G3 delivered by the flip-flop 293 (FIG. 14), thus:

The subscriber's code stored in the register 211 (FIG. 13) is transferred by the activation of the multiple AND circuit 217 (FIG. 14) for the logical condition $T10xG3xN1$ set up by the AND circuit 397 (FIG. 14).

The code stored in the channel code register 233 (FIG. 11) is transferred for the logical condition:

$$T10xG3xN1 \quad (11)$$

It is not necessary to transfer the concentrator code.

The program of code modifications concerning the subscriber identification in communication on a given channel (order N2) will be studied last.

Initially, a code S0 is stored, at the beginning of the considered cycle of phase signals, on the line Y of the operation store. The data being stored in the registers 285 (FIG. 14) and 233 (FIG. 11) of the cycle SP(1) it is known that one has, in SP(2):

$S0xCAx(T1–T7)=B6$ controlling the writing of the code S2 on the line Y of the operation store 260.

The code stored in the register 233 is compared afterward to the codes received in $tY$ during the two next frame periods and one has, if the result of the test is positive:

$$S2xVExN2xG2=B6 \quad (9.2)$$

controlling the writing of the code S1 on the line Y of the operation store.

$$S3xVExN2xG2=B6 \quad (9.3)$$

controlling the storage of the code S2 on the line Y of the operation store.

In T8, a zero code is stored on the line Y, whatever may be the result of the test:

$$(S1+S2+S3+S4)T8xG2xN2=S0 \quad (12)$$

This identification operation may last $k$ cycles of phase signals and it is ended when a signal G3 is set up. This signal controls then the transfer of the following information to the common control circuit:

Subscriber's code stored in the cyclic generator 220 (FIG. 10) by the activation of the multiple AND circuit 297 for the logical condition $T10xG3xN2$ set up by the logical circuits 295 and 277 (FIG. 14).

Channel code stored in the register 233 (FIG. 11) for the logical condition $$T10xG3xN2 \quad (13)$$

As in the previous case, it is not necessary to transfer the concentrator code.

By comparing the Equations 11 and 13 it is seen that they may combine themselves into:

$T10xG3x\overline{N0}$ since one has: $N1+N2=\overline{N0}$

Besides, since a signal G3 means that the operation which has been completed was an auxiliary operation, this expression may still be simplified into $T10xG3$, this condition controlling the transfer of the channel code to the common control circuit by the activation of the multiple AND circuit 242.

The several processes of generation of the normal advance signal B6, have been described in relation with the FIG. 11.

However, it will be noted that, by combining the Equations 9.1, 9.2, 9.3, one obtains:

$$[S3xN1+(S2+S3)xN2]xG2xVE=B6$$

This equation is different from that set up by the logical circuits 237, 238, 279 (FIG. 11). Since one has $\overline{N0}=N1+N2$, it does not comprise the term $$S2xN1xG2xVE$$

The simplification brought by these logical circuits is nevertheless perfectly valid since it is the first signal 29*c* which sets the flip-flop 267 to the 1 state.

The "forced advance" signals K and L are provided by the logical unit 275 (FIG. 10). A signal K in S0 is obtained by the combination of the logical Equations 4, 5, 6, 7, 8, 10, 12.

$$K=(S1+S2+S3)xT8x\overline{G2}+(S1x\overline{F}+S4xF+S2+S3)xT12+S1xT13+S4x\overline{PC}xT13+S5xVLxT13+(S1+S2+S3+S4x\overline{Z2})xT8xG2xN1+N2xT8xG2x(S1+S2+S3+S4)$$

This equation may be simplified as follows:

$$K=[(S1+S2+S3)+(\overline{Z2}xN1+N2)xS4xG2]xT8+(S1x\overline{F}+S4xF+S2+S3)xT12+(S1+S4x\overline{PC}+S5xVL)xT13 \quad (14)$$

A forced advance signal L controlling the writing of the code S1 is obtained by the logical condition [3] $L=S4xT8x\overline{G2}$.

FIGS. 11, 12 represent the detailed diagram of the logical unit 275 which is established directly from the Equations 3 and 14. The signals corresponding to each one of the three members of the Equation 14 are applied to the OR circuit 401. The first member of this equation is materialized by the circuits 431 to 436, the second member by the circuits 411 to 414 and the third member by the circuits 421 to 424.

The Equation 3 is materialized by the AND circuit 402.

While the principles of the invention have been described above in connection with specific apparatus and applications, it is to be understood that this description is made only by way of example and not as a limitation on the scope of the invention.

We claim:

1. A telephone system comprising a plurality of concentrators connected to a distant telephone office via time division multiplexing highways, there being M channels on each of said highways, local clock means at said office and each of said concentrators for generating channel time slots, space division switching means at said office for selectively transmitting signals appearing in any of said channels to any other of said channels, means at each of said concentrators for synchronizing the clock means at said concentrators with the clock means at said office responsive to signals received over said highways, means for connecting $k$ number of subscriber lines to said concentrators, means in each of said concentrators comprising a subscriber memory store circuit having M number of lines of storage capacity which corresponds to the number of channels on said highway, each of said M lines being individually associated with one of the M channels on the highway extending from the concentrator including a subscriber store circuit to said office, means for storing a first signal in each line of said subscriber store circuit associated with an idle highway channel, means for storing a second signal identifying a conversing subscriber station in each line of said subscriber store circuit associated with a busy highway channel, means responsive to said identification signal for connecting said conversing subscriber station to said highway during the time slot assigned to carry said conversation, whereby the conversation is sampled, and means whereby the time separating two successive samples of the same conversation is one time frame period.

2. The system of claim 1 and register means in each of said concentrators for registering conversing subscriber identifications, means responsive to every time frame for comparing the subscriber identifications in said register and said store circuit, means responsive to said comparing means finding an identity of identifications for storing a highway channel code responsive to the output of the concentrator clock, and means for storing a zero signal in said register at the beginning of each time frame, whereby said register means indicates idle lines by zero signals and busy lines by subscriber identifications.

3. The system of claim 2 and means comprising a service channel on said highway for storing subscriber identification signals in said register, means jointly responsive to the end of a time frame and to a zero signal in said register for transferring the code received over a service channel to a line in said subscriber store circuit.

4. A telephone system comprising a plurality of concentrators, a plurality of telephones, means comprising a subscriber line associated with each of the telephones for transmitted voice frequency signals to said concentrators, an office, means comprising a plurality of time division multiplex trunks connecting said concentrators to the office, a plurality of other time division multiplex trunks also connected to the office, space division switch means in said office for connecting any channel on a given trunk to a channel on any other trunk during a particular one among many time slots, call detector means located in the office and coupled to a trunk, switching means for coupling a service channel of each trunk to a channel of said call detector means assigned to the trunk, clock means located in the office for repetitively generating cycles of signals in time succession; store means in the call detector comprising an operation store with a number of elementary stores which corresponds to the number of channels on a trunk, means for storing in each one of said elementary stores a code characterizing the state of the operations carried out under the control of said signals, cyclic reading means in the concentrator for reading selector information from each one of the operation elementary stores, register means for re-writing stored codes in a recording register, means for modifying the code stored in said register, cyclic re-writing means for writing in the store the codes stored successively in this register, and means applied to the recorder register before the beginning of each cycle of signals for storing a code on each one of the elementary stores.

5. A time division multiplex telephone system comprising an office having a plurality of concentrators associated therewith via multi-channel highways, means for selecting and using any free one of said channels as a service channel over which said office and concentrators may exchange control information, local clock means at said office and each of said concentrators, means responsive to signals transmitted during a particular time slot for synchronizing said clocks, and space division switching means operated responsive to said exchange control information for selecting particular time slots to provide a given connection for giving communication through said system.

6. The system of claim 5 wherein said space division switching means comprises a plurality of elementary data storage circuits, the number of elementary circuits coinciding with the number of channels between said office and a concentrator, register means, means for storing a signal identifying a call in said register and in an elementary circuit associated with a given channel assigned to said call, means for comparing said call identifying data, and means responsive to said comparing means finding the same call identifying signals in a register and an elementary circuit for applying a voice frequency signal to the channel associated with the elementary circuit.

7. The system of claim 6 and means in said office for remotely controlling said space division switch in said concentrator.

8. The system of claim 7 and a plurality of subscriber lines at each of said concentrators, means responsive to said remote control means for causing said concentrator to each for calling subscriber lines.

9. The system of claim 8 and means responsive to said remote control means for causing said concentrator to test subscriber lines for busy or idle conditions.

10. The system of claim 9 and means responsive to said remote control means for causing said concentrator to identify subscriber lines to said office.

11. The system of claim 6 and $k$ number of subscriber lines at each of said concentrators, there being $m-1$ concentrators and $k \geqq 2^8$, whereby each subscriber line is identified by an eight digit code.

12. The telephone system of claim 5 and means whereby any idle channel between said office and a concentrator may be used as a service channel for exchanging control signals.

13. A time division multiplex telephone system comprising an office having a plurality of concentrators associated therewith via multi-channel highways, local clock means at said office and each of said concentrators, means responsive to signals transmitted during a particular time slot for synchronizing said clocks, space division switching means for selecting particular time slots to provide a given connection for giving communication through said system, said space division switching means comprises a plurality of elementary data storage circuits, the number of elementary circuits coinciding with the number of channels between said office and a concentrator, register means, means for storing a signal identifying a call in said register and in an elementary circuit associated with a given channel assigned to said call, means for comparing said call identifying data, means responsive to said comparing means finding the same call identifying signals in a register and an elementary circuit for applying a voice frequency signal to the channel associated with the elementary circuit, $k$ number of subscriber lines at each of said concentrators, there being $m-1$ concentrators and $k \geqq 2^8$, whereby each subscriber line is identified by an eight digit code, and means in said concentrator for identifying connected subscriber lines to said office by sending the first four digits of a subscriber code during one time period and the next four digits of a subscriber code during the next succeeding time period.

References Cited by the Examiner

UNITED STATES PATENTS

| | | | |
|---|---|---|---|
| 2,957,949 | 10/1960 | James et al. | 179—18.9 |
| 3,118,019 | 1/1964 | Feder et al. | 179—15 |
| 3,172,956 | 3/1965 | Inose et al. | 179—15 |

DAVID G. REDINBAUGH, *Primary Examiner.*

ROBERT L. GRIFFIN, *Examiner.*